US008191672B2

(12) United States Patent
Kondo et al.

(10) Patent No.: US 8,191,672 B2
(45) Date of Patent: Jun. 5, 2012

(54) STORAGE SYSTEM, STORAGE PANEL, AND STORAGE WALL

(75) Inventors: Tetsujiro Kondo, Tokyo (JP); Akihiko Arimitsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 1005 days.

(21) Appl. No.: 12/143,177

(22) Filed: Jun. 20, 2008

(65) Prior Publication Data

US 2009/0039744 A1 Feb. 12, 2009

(30) Foreign Application Priority Data

Aug. 8, 2007 (JP) ................................ 2007-207138

(51) Int. Cl.
*G01S 3/80* (2006.01)

(52) U.S. Cl. ....................................... 181/125; 312/326

(58) Field of Classification Search .................. 181/125; 312/326, 223

See application file for complete search history.

(56) References Cited

U.S. PATENT DOCUMENTS

2002/0010528 A1* 1/2002 Bartholomew et al. ....... 700/239
2002/0195467 A1* 12/2002 Meder et al. ............... 222/146.6
2004/0211210 A1* 10/2004 Crisp, III ........................ 62/389
2006/0196887 A1* 9/2006 Crisp et al. ................. 222/129.1
2010/0282772 A1* 11/2010 Ionidis .............................. 222/1
2011/0108569 A1* 5/2011 Jones et al. ....................... 222/1

FOREIGN PATENT DOCUMENTS

JP 849958 * 8/1994
JP 2005-323840 11/2005
JP 2007-67538 3/2007

OTHER PUBLICATIONS

Office Action issued Feb. 27, 2012 in Japanese Appl. No. 2007-207138, filed Aug. 8, 2007 without an English Translation.

* cited by examiner

*Primary Examiner* — Forrest M Phillips

(74) *Attorney, Agent, or Firm* — Oblon, Spivak, McClelland, Maier & Neustadt, L.L.P.

(57) ABSTRACT

A storage system is provided. The storage system includes a storage unit that stores items; and a panel-shaped display that displays an image of a storage state of the items stored in the storage unit. The storage unit is provided on the backside of the display.

16 Claims, 17 Drawing Sheets

| | VIBRATOR POSITION | KIND OF SOUND SOURCE |
|---|---|---|
| SHELF 1 | 1ST | MUSIC 1 |
| SHELF 2 | 2ND | MUSIC 2 |
| SHELF 3 | 3RD | MUSIC 3 |
| SHELF 4 | 4TH | MUSIC 4 |

STORAGE SYSTEM, STORAGE PANEL, AND STORAGE WALL

CROSS REFERENCES TO RELATED APPLICATIONS

The present invention contains subject matter related to Japanese Patent Application JP 2007-207138 filed in the Japanese Patent Office on Aug. 8, 2007, the whole contents of which being incorporated herein by reference.

BACKGROUND OF THE INVENTION

1. Field of the Invention

The present invention relates to a storage system, a storage panel, and a storage wall. Specifically, for example, the present invention relates to a storage system suitably used for a screen including a panel with an audio-output function and a display function, a storage panel with such a storage system, and a wall with such a storage panel.

2. Description of the Related Art

Heretofore, screen speakers have been used. The screen speaker may serve as a partition or screen for partitioning and blinding a room or the like in addition to serving as a speaker. In the screen speaker disclosed in Japanese Unexamined Patent Application Publication No. 2007-67538 entitled "Audio Output Device and Room" and previously filed by the present inventors, a frame structure with a replaceable plate member is used for improving a sound-transmission efficiency. In addition, for improving sound-transmission efficiency, the screen speaker is provided with a rotational shaft to automatically rotate the screen speaker. These screen speakers are provided with displays, mirrors, and others and designed to realize the functions thereof in addition to a speaker function. Furthermore, a combination of two or more of these screen speakers can be used as screens or walls that constitute a room.

Referring to FIG. 1, the schematic configuration of the screen speaker disclosed in Japanese Unexamined Patent Application Publication No. 2007-67538 will be described. As shown in FIG. 1, a screen speaker 201 includes panel-shaped diaphragms 202A to 202C which are vertically aligned. Each diaphragm has three vibrators 203A to 203C attached thereon. In addition, wheels 211A and 211B are mounted at the upper end of the screen speaker 201, so that the screen speaker 201 can be horizontally moved by allowing the wheels 211A and 211B to slide along a rail 221 formed on the ceiling 220. Since the screen speaker 201 is formed as described above, the screen speaker 201 can move along the rail 221. Thus, various room layouts can be designed.

SUMMARY OF THE INVENTION

In the screen speaker disclosed in Japanese Unexamined Patent Application Publication No. 2007-67538, there is a space (empty region) with a certain size on the backside of the diaphragm (panel) of the screen speaker. Thus, an efficient use of such a space has been desired.

It is desirable to provide a unit for efficiently using a space formed on the backside of a panel, such as a screen speaker.

According to an embodiment of the present invention, there is provided a storage system including a storage unit storing items; and a panel-shaped display displaying an image of a storage state of the items stored in the storage unit, in which the storage unit is provided on the backside of the display.

According to another embodiment of the present invention, there is provided a storage panel including a storage system. The storage system includes a storage unit storing items; a panel-shaped display displaying an image of a storage state of the items stored in the storage unit, in which the storage unit is provided on the backside of the display; and a frame having one or more rectangular openings and removably fixing the display in the opening.

According to further another embodiment of the present invention, there is provided a storage wall including a storage panel. The storage panel includes a storage system. The storage system includes a storage unit storing items; a panel-shaped display displaying an image of a storage state of the items stored in the storage unit, in which the storage unit is provided on the backside of the display; and a frame having one or more rectangular openings and removably fixing the display in the opening.

According to the configurations of the above-described embodiments of the present invention, the storage unit is formed on the backside of the panel-shaped display, so that the space on the backside can be used efficiently.

According to the embodiments of the present invention, the space formed on the backside of the panel can be used efficiently as a storage part (storage system). Thus, a panel having a storage system and a wall having such a panel can be realized.

BRIEF DESCRIPTION OF THE DRAWINGS

FIG. 2A is a front view and FIG. 2B is a cross-sectional view along the line X-X in FIG. 2A.

FIG. 4A is a backside view, FIG. 4B is a front view, and FIG. 4C is a side view.

FIG. 5A represents an example in which the cameras are fixed on the respective shelves and FIG. 5B represents an example in which cameras are arranged on a wall.

FIG. 6A represents an initial state and FIG. 6B represents a rotated state.

FIG. 8A represents information obtained when viewing the stored items from the backside and FIG. 8B is an exemplified actual display of the information.

FIG. 9A represents information obtained when viewing the stored items from the backside and FIG. 9B is an exemplified image in which an image is flipped.

FIG. 10A is a schematic front view and FIG. 10B is a schematic top view.

FIG. 11A represents a single upward-swing panel and FIG. 11B represents a single rightward-swing panel.

FIG. 12A represents an image before taking out the stored item, FIG. 12B is an image after taking out the stored item.

DESCRIPTION OF THE PREFERRED EMBODIMENTS

Hereinafter, examples of the respective embodiments of the present invention will be described with reference to the attached drawings. The embodiments described below are preferable illustrative embodiments of the present invention, so that they have various preferable technical limitations. However, these embodiments have no intention of restricting the scope of the invention in any sense as long as no description about any limitation of the invention will be found in the following description. For example, processing times, processing sequences, and numerical conditions in the following description are only of preferred examples. Dimensions, shapes, and arrangements in the respective drawings are for illustrative purpose only.

Figure 2A:
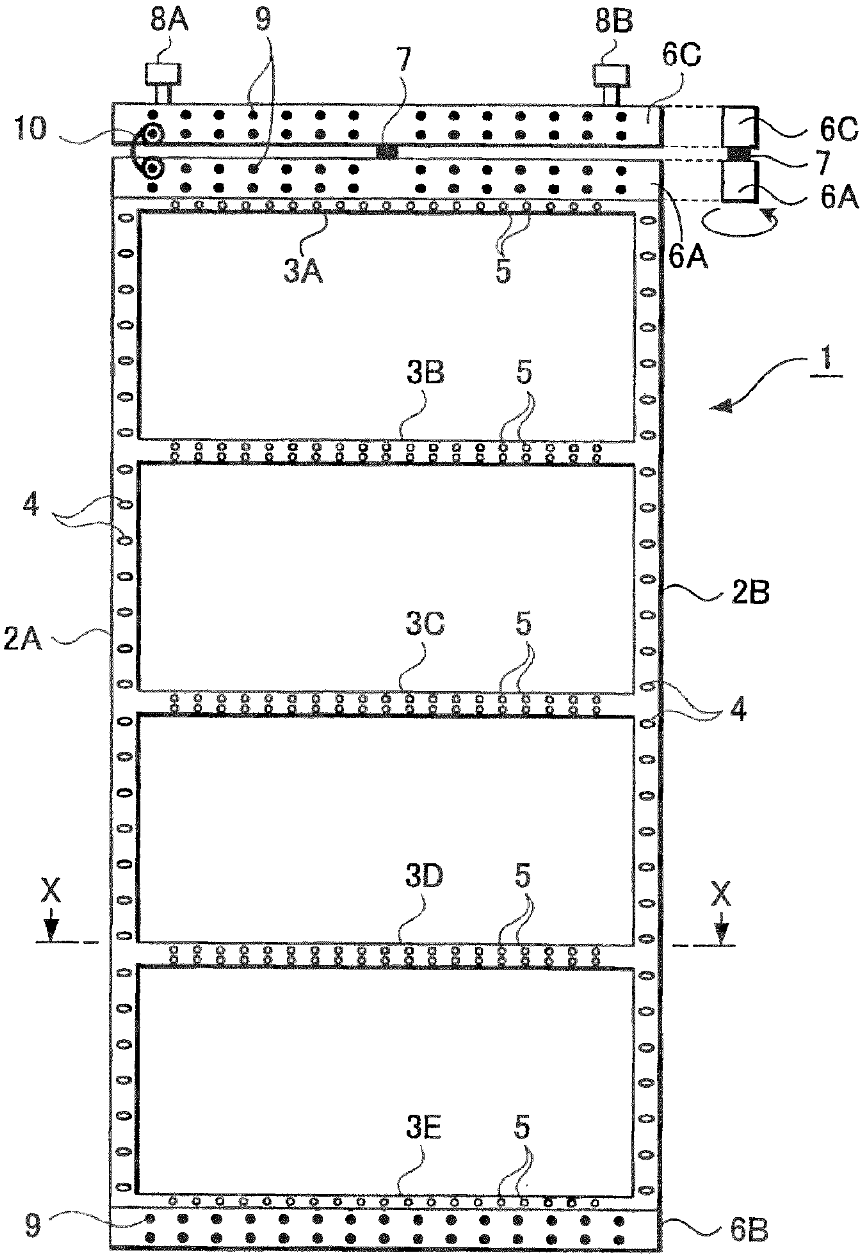
FIGS. 2A and 2B are schematic diagrams illustrating an exemplified frame structure of a screen speaker according to an embodiment of the present invention, where
Figure 2B:
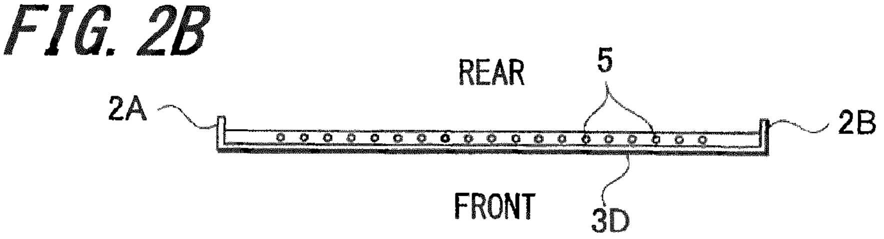

FIGS. 2A and 2B illustrate an exemplified frame structure of a screen speaker according to an embodiment of the present invention, where FIG. 2A is a front view and FIG. 2B is a cross sectional view along the line X-X in FIG. 2A. The screen speaker has the functions of a storage unit and a screen as well as the function of a speaker and can also be provided as an example of any of the storage system, storage panel, and storage wall according to an embodiment of the present invention. As will be described later, the storage unit according to an embodiment of the present invention uses the back surface of a screen speaker, enabling the storage unit to have user-friendly storage function using a speaker, a television display, and a sensor, which are provided with the related-art screen speaker.

As shown in FIGS. 2A and 2B, the present inventors have provided a frame structure 1 as a result of an improvement in one of the related-art screen speakers (for example, one disclosed in Japanese Unexamined Patent Application Publication No. 2007-67538). The frame structure 1 similar to the related-art screen speaker includes main frames 2A and 2B each extending in the vertical direction, in which a large number of tapped holes 4 are formed for mounting plate-shaped members (such as speakers and mirrors), video equipment (such as displays), and so on. The frame structure 1 also includes sub-frames 3A to 3E each extending in the horizontal direction, in which a large number of tapped holes 4 are formed similarly to the case with the main frames 2A and 2B. In the present embodiment, four substantially rectangular openings are formed by two main frames 2A and 2B and five sub-frames 3A to 3E. A desired panel-shaped device, such as a flat-panel display, a flat-panel speaker, or a mirror may be fit in the opening. Hereinafter, the term "panel" inclusively refers to any of panel-shaped devices or members including flat-panel displays, flat-panel speakers, and mirrors to be fit in the screen speaker.

The frame 1 is provided with a horizontal member, a beam (also referred to as a joist or a girder) 6A, on the upper side thereof and another horizontal member, a beam 6B, on the lower side thereof. In addition, many tapped holes 9 are formed in each of these beams 6A and 6B. Furthermore, the beam 6A is rotatably connected to a beam 6C through a rotational shaft 7. The rotational shaft 7 is of a hollow structure through which various kinds of cables, such as speaker cables, video cables, and control cables, can be passed. Furthermore, the example shown in FIG. 2 is provided as a screen speaker hung from the ceiling and rotating. Alternatively, similar to the one described in Japanese Unexamined Patent Application Publication No. 2007-67538 filed by the present applicant, a rotational shaft may be provided with a base to rotate a screen speaker relative thereto about the rotational shaft. Alternatively, a rotational shaft may be mounted on the lower-side beam 6B to rotate a screen speaker relative to the floor surface.

Figure 1:
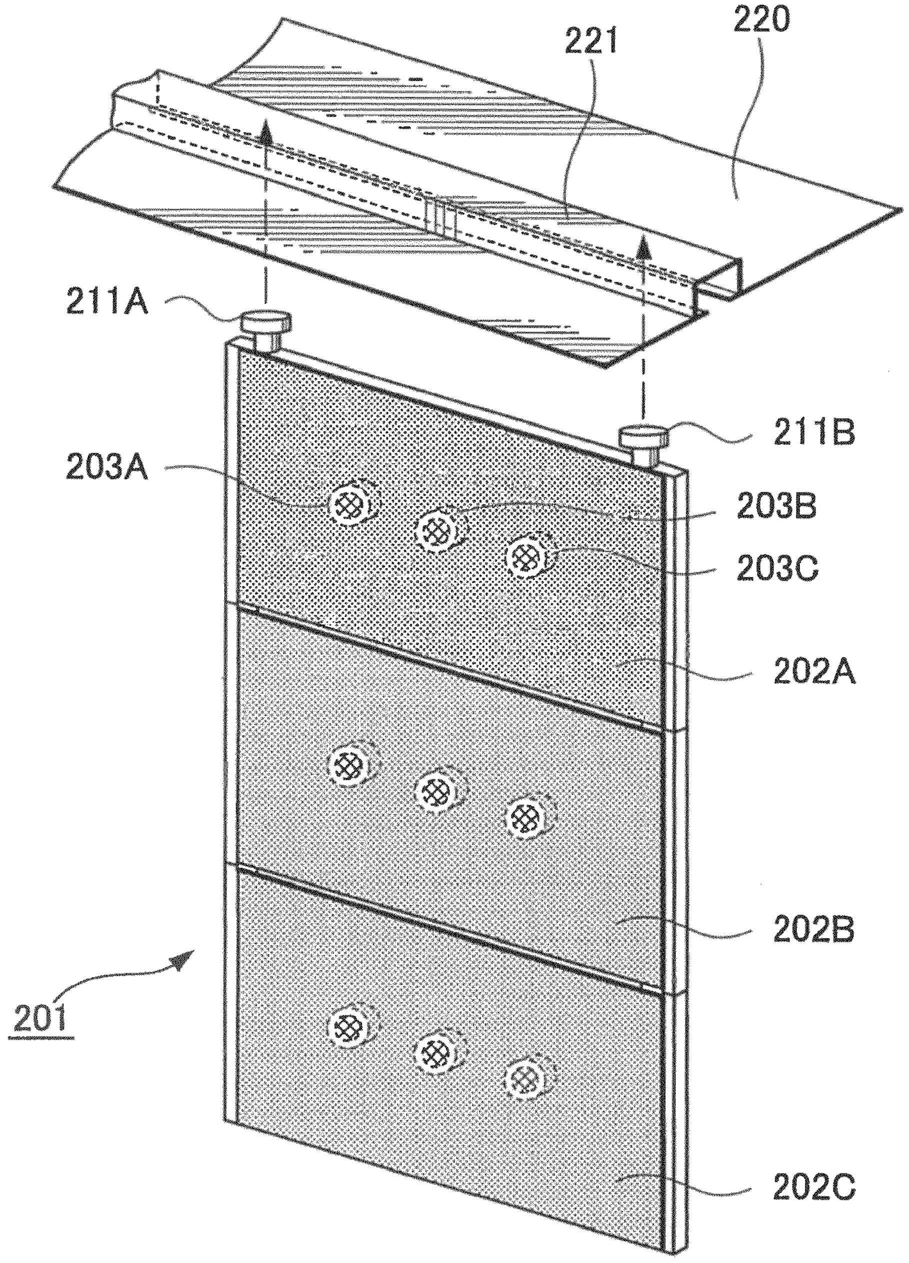
FIG. 1 (RELATED ART)
FIG. 1 is a schematic perspective diagram illustrating a related-art screen speaker.

Furthermore, the beam 6C is provided with wheels 8A and 8B thereon to hang the frame. In a manner similar to the related-art shown in FIG. 1, a screen speaker can be horizontally moved along a guide (rail 221) on the ceiling 220 without restriction by allowing the wheels 8A and 8B to slide along the guide.

Furthermore, as shown in FIG. 2B, a large number of tapped holes 5 are formed in the sub-frame so that a storage part (such as a shelf) described later can be fixed on the sub-frame by means of screw-cramp or the like. In this embodiment, the tapped holes are formed through front and back surfaces and top and bottom surfaces.

Furthermore, the frame 1 is provided with a lock mechanism 10 for locking and unlocking the rotation of the frame 1. The configuration of the lock mechanism 10 is not specifically limited and may be one known in the art. For example, a door stopper for fixing a rotational position may be mounted on the lower-side beam 6B.

The frame structure of the present embodiment is based on the technology of screen speaker described in Japanese Unexamined Patent Application Publication No. 2007-67538 and has functions and features including at least those described below. For details, the aforementioned Japanese Unexamined Patent Application Publication No. 2007-67538 may be referred to.

It is a frame structure hung on a rail extended on the ceiling.
The height of the frame structure reaches from the ceiling to the floor.
The frame structure is one on which a plate member is mounted.
A video device or the like can be mounted on the frame structure.
The video device can be provided with a flat-panel speaker and a speaker.
A plurality of the video devices can be mounted on the frame structure depending on the dimensions of the respective video devices.
The frame structure includes at least one rotational shaft.
Various cables can be passed through the rotational shaft.
A plurality of tapped holes is formed in a beam extending over the rotational shaft.
The tapped holes are formed through front and back surfaces and top and bottom surfaces of the beam.

Figure 3:
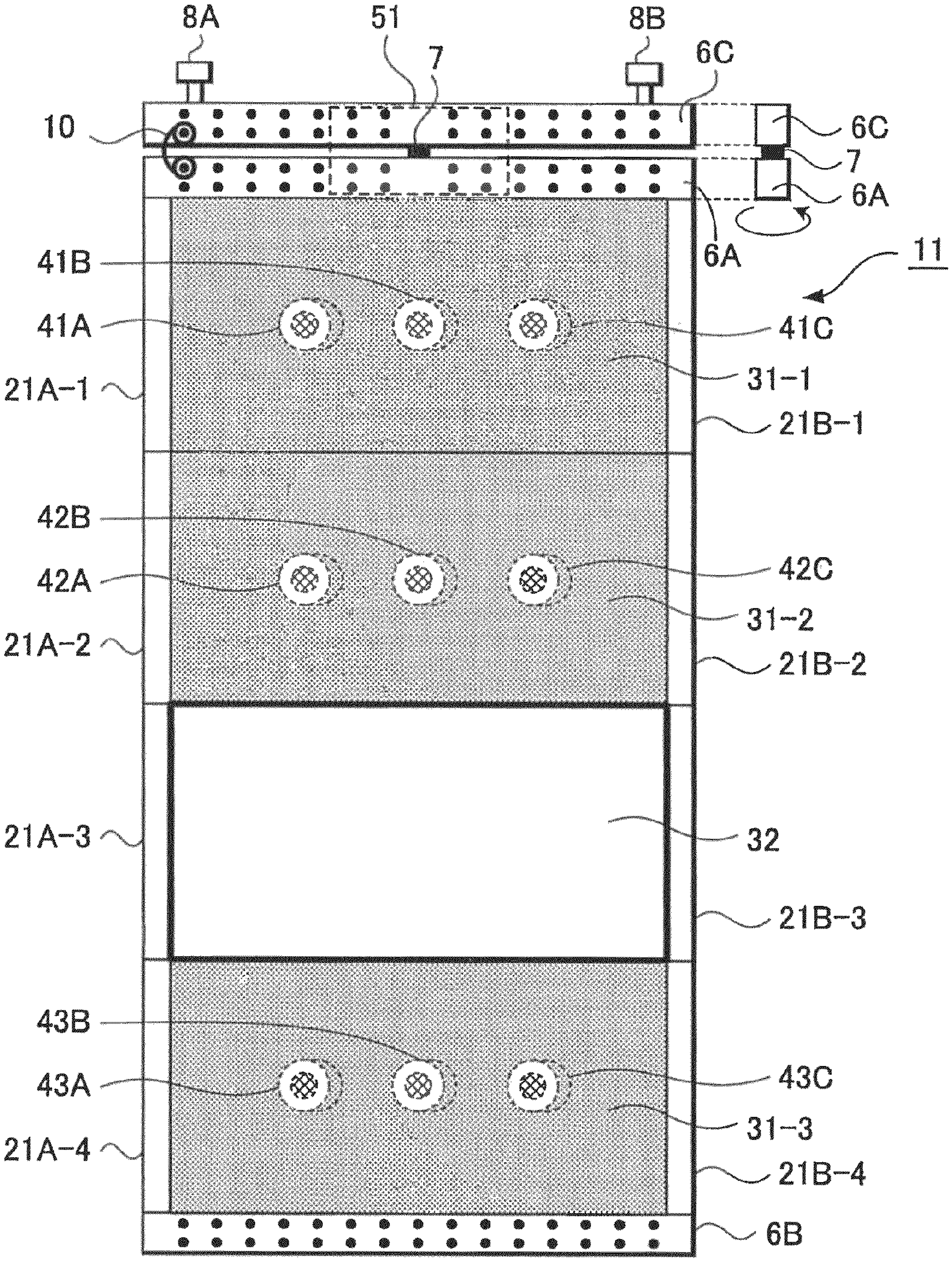
FIG. 3 is a schematic diagram illustrating the front side of a screen speaker according to an embodiment of the present invention.

FIG. 3 is a diagram illustrating the front side of a screen speaker according to the embodiment of the present invention. As shown in FIG. 3, the screen speaker 11 includes vibration member supports 21A-1 to 21A-4 and 21B-1 to 21B-4 in the weighting direction; vibrating panels 31-1 to 31-3; vibrators 41A to 41C, 42A-42C, and 43A to 43C mounted on the respective vibrating panels to cause vibrations; and a flat display 32 for image display. The display 32 may be provided with a flat-panel speaker or a side speaker dedicated to a liquid crystal display (LCD). Note that, an anterior-posterior vibration member support, a vibration support in the horizontal direction with respect to the diagram is not shown in the figure. The structural strength of each panel in the anterior-posterior direction can be increased by providing the panel with the anterior-posterior vibration member support. For details, Japanese Unexamined Patent Application Publication No. 2007-67538 may be referred to.

The screen speaker 11 shown in FIG. 3 includes four panels arranged in the vertical direction. In this case, the first, second, and fourth panels from the top are diaphragms constituting flat panel speakers, respectively. In addition, a display is mounted on the third panel. However, the configuration of the screen speaker 11 is not limited to one shown in FIG. 3. Alternatively, for example, the number of panels may be further increased or the single array of panels may be replaced with two or more arrays thereof.

Figure 4A:
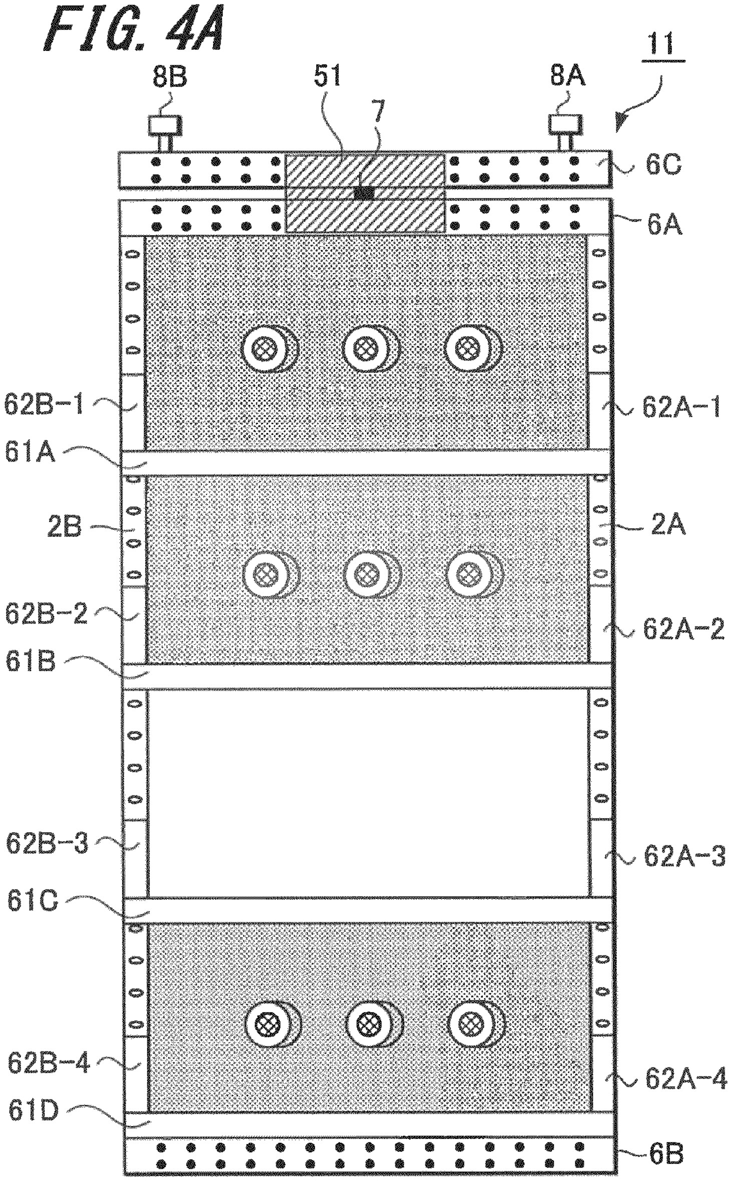
FIGS. 4A to 4C are schematic diagrams illustrating a screen speaker according to an embodiment of the present invention, where
Figure 4C:
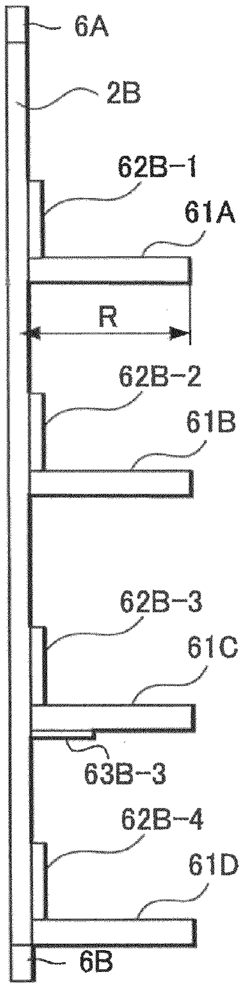
Figure 4B:
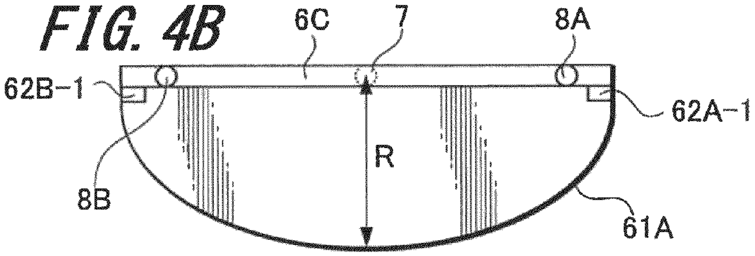

FIGS. 4A and 4B are diagrams illustrating the screen speaker 11 according to the embodiment of the present invention, where FIG. 4A is a backside view, FIG. 4B is a top view, and FIG. 4C is a side view. A rotary mechanism 51 is mounted on the backside of the screen speaker 11 for rotating the screen speaker 11. The rotary mechanism 51 is constructed using the technology known in the art. Alternatively, a motor mechanism dedicated and provided to the rotation shaft 7 may replace the rotary mechanism 51.

Shelves 61A to 61D can be mounted on the main frames 2A and 2B using mounting jigs 62A-1 to 62A-4 and 62B-1 to 62B-4, respectively, at the positions corresponding to the respective panels. Each of the shelves 61A to 61D has a curved profile with the maximum radius of rotation about the rotational shaft 7 to prevent the screen speakers from touching each other even if a plurality of such speakers is lined. In other words, as shown in FIG. 4B, it means that "R<radius of rotation" where R represents the distance from the center of the rotational shaft 7 to the end of the shelf in the direction perpendicular to the panel. The shelf may be designed to prevent any product from falling out of the shelf. For example, the shelf may be provided with a stopper along the peripheral portion of the shelf. Furthermore, reinforcement members 63B-1 to 63B may be provided on the lower side of respective shelves to increase and stabilize the strength thereof.

Figure 5A:
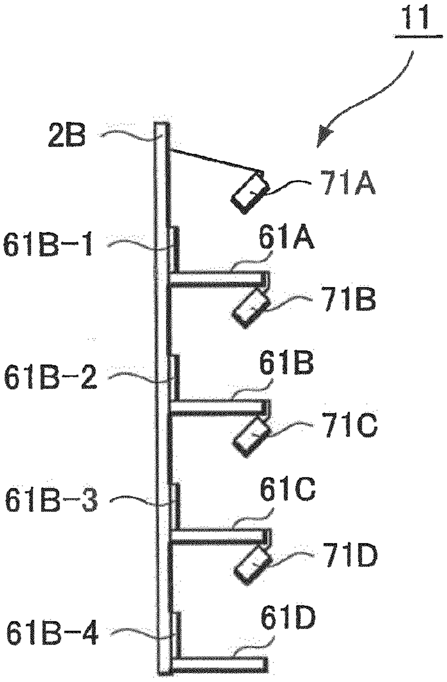
FIGS. 5A and 5B are schematic diagrams illustrating an example of the arrangement of cameras on an screen speaker according to an embodiment of the present invention, where
Figure 5B:
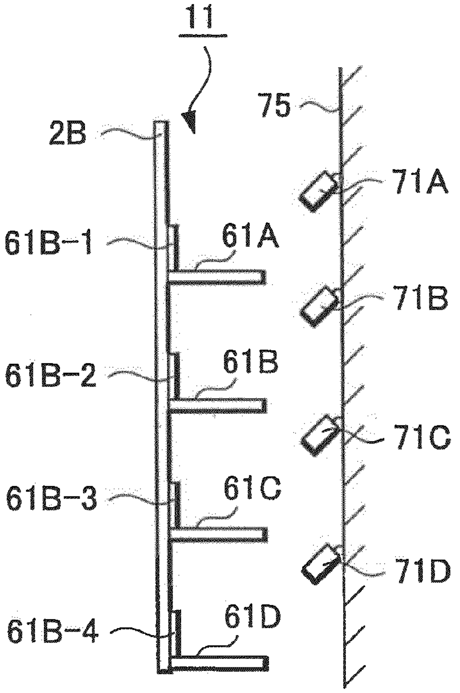

An image sensor, such as a camera unit, can be mounted on the screen speaker 11 of the present embodiment. FIGS. 5A and 5B are diagrams illustrating an example of the arrangement of cameras on the screen speaker 11 of the present embodiment. FIG. 5A represents an example in which cameras are fixed on the respective shelves and FIG. 5B represents an example in which cameras are arranged on a wall. As shown in FIG. 5A, camera units 71A to 71D are fixed on the shelves immediately above the respective shelves desired to capture images thereof and the angles of the respective camera units 71A to 71D are adjusted to capture images of the storage states of the respective shelves. In this case, an image of the top shelf is captured after fixing the camera unit on the frame. Alternatively, as shown in FIG. 5B, the camera units 71A to 71D may be mounted on a wall 75 on the backside of the screen speaker 11 to capture images of the storage states of the respective shelves. Lighting may be mounted behind each panel. In addition, a flash may be attached to the camera unit or an infrared camera may be used.

As described above, the camera unit is mounted on each shelf on the backside of the screen speaker 11, so that the state of the shelf can be observed and the storage state of a stored item can be comprehended. Furthermore, the camera units are located on the backside of the screen speaker 11, so that there may be no need to secure a space for the camera units on the front side and the presence of the camera units can be kept unnoticeable.

Figure 6A:
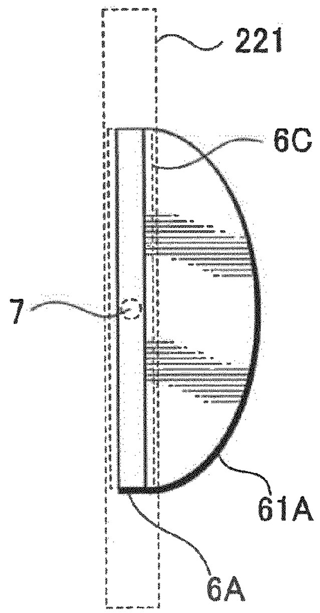
FIGS. 6A and 6B are schematic diagrams illustrating an exemplified screen speaker according an embodiment of the present invention, where
Figure 6B:
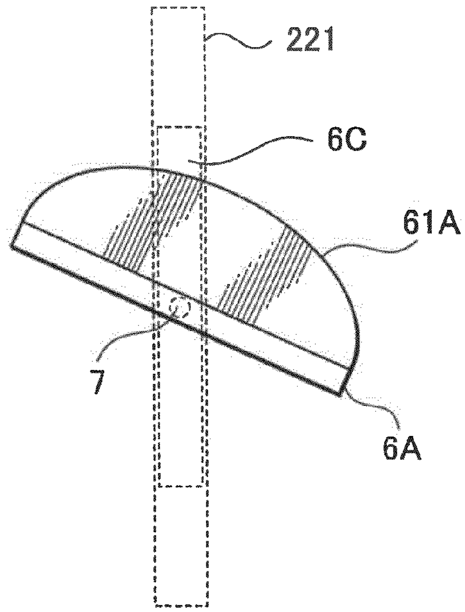

FIGS. 6A and 6B are explanatory diagrams illustrating an example of rotation of the screen speaker of the present embodiment, where FIG. 6A represents the initial state and FIG. 6B represents the rotated state. Since the screen speaker 11 can be rotated, the shelf 61A is rotated and changed from the initial state (FIG. 6A) to the state of allowing the user to take out an item stored on the shelf on the backside of the panel (FIG. 6B). Such a configuration of the shelf allows the user to easily take out an item stored on the shelf on the backside of the panel. The example shown in FIGS. 2 to 4 is one in which the whole of the screen speaker 11 can rotate. Alternatively, the respective panels may rotate individually. As compared with the case where the whole screen speaker 11 is rotated, an item stored on the intended shelf can be taken out easily and quickly.

On the other hand, when the image of the backside of the panel taken by the camera unit shown in FIGS. 5A and 5B is displayed on the display 32 mounted on the screen speaker 11, a state of items stored on the backside of the panel can be known from the front side of the panel without rotating the screen speaker 11.

Figure 7:
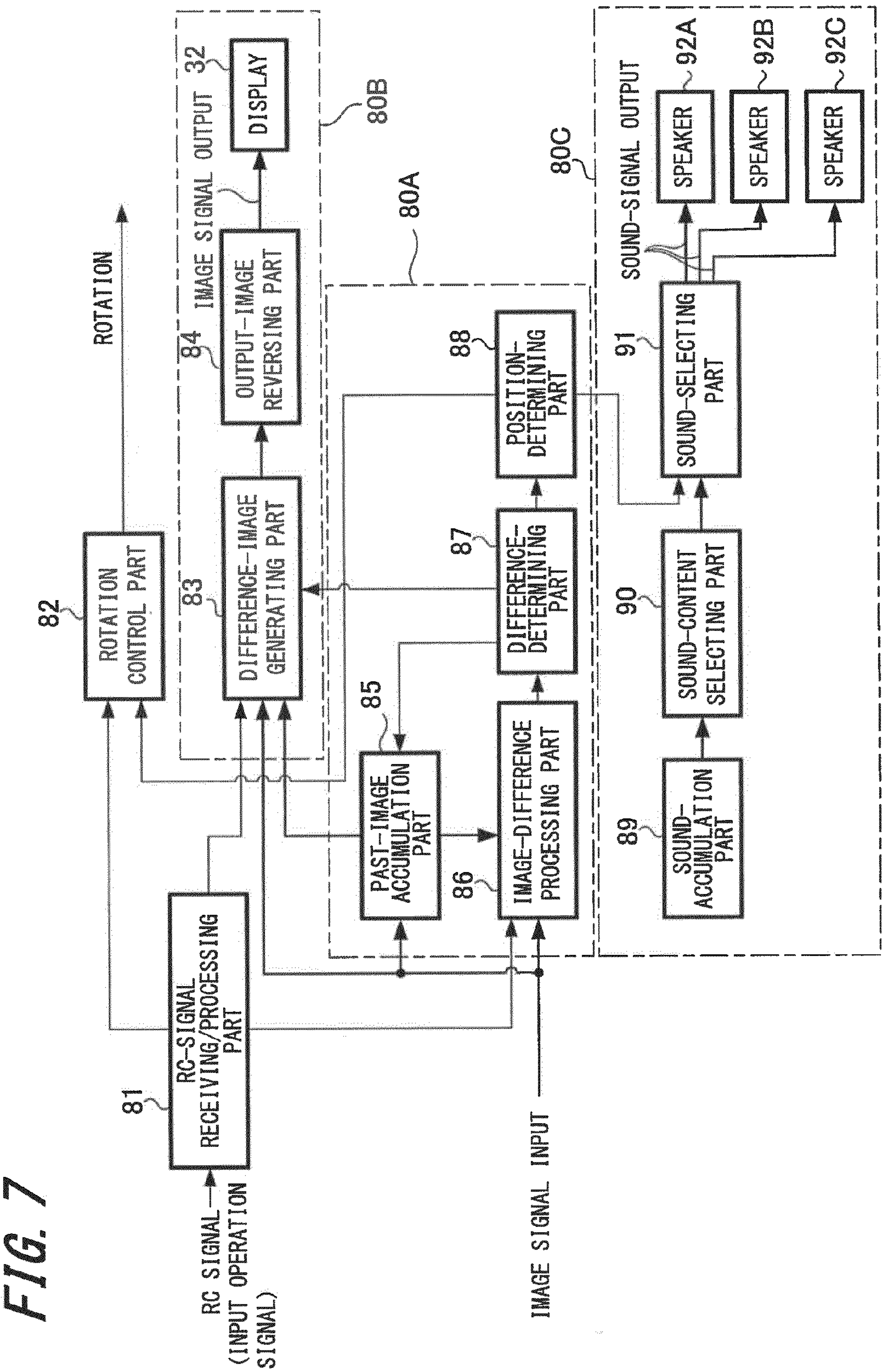
FIG. 7 is a block diagram illustrating an exemplified inner configuration of a storage system according an embodiment of the present invention.

Next, an exemplified configuration of the inside of the storage system of the present embodiment will be described with reference to the block diagram in FIG. 7.

A storage system is provided for storing and managing an item. The storage system of the screen speaker 11 mainly includes a part 81 for receiving and processing remote-control signals (hereinafter, also referred to as a RC-signal receiving/processing part 81); a rotation control part 82; a difference-detecting device 80A, an image-notification device 80B; a sound-notification device 80C. Signals input to and output from the storage system include image signals, sound signals, and control signals. By operating a remote-control device (hereinafter, referred to as a "RC device", not shown in the figure), the user can input remote-control (RC) signals with given commands into the RC-signal receiving/processing part 81. An example shown in FIG. 7 is designed to input RC signals. Alternatively, given command signals may be input by operating operation keys formed in a predetermined position on the screen speaker 11.

The RC-signal receiving/processing part 81 receives RC signals not shown in the figure and analyzes the commands thereof, followed by outputting the commands to the rotation control part 82, a difference-image generating part 83 of the image-notification device 80B, and an image-difference processing part 86 of the difference-detecting device 80A. Furthermore, the RC-signal receiving/processing part 81 can also receive other operation signals input from operation keys (not shown) arranged on the screen speaker 11 than RC signals.

The rotation control part 82 controls a rotational movement of the rotary mechanism 51 in response to the commands input from the RC-signal receiving/processing part 81 or a position-determining part 88 of the difference-detecting device 80A.

Here, the difference-detecting device 80A will be described. The difference-detecting device 80A is designed to detect a difference between images of an item before and after stored in a storage part (or a difference between the states before and after taking out a stored item) on the basis of the images obtained by the camera unit. The difference-detecting device 80A mainly includes a past-image accumulation part 85, the image-difference processing part 86, a part 87 for determining the presence or absence of difference (hereinafter, also referred to as a difference-determining part 87), and a position-determining part 88.

The past-image accumulation part 85 mainly records and accumulates image signals of the state inside the storage part before the storage or after the takeoff, which are taken by the camera unit. The past-image accumulation part 85 may be any of nonvolatile memories, such as a hard disk drive and a semiconductor memory.

The image-difference processing part 86 makes a comparison between an image with image signals input from the camera unit and previous images accumulated in the past-image accumulation part 85, followed by carrying out the process of extracting the difference. Subsequently, the results of the process are input into the difference-determining part 87.

The difference-determining part 87 determines whether a difference is in two images compared to each other on the basis of the result of the difference processing at the image-difference processing part 86. Subsequently, the result of the determination is then output to the difference-image generating part 83 of the image-notification device 80B and the position-determining part 88. In addition, the result of determining the presence or absence of the difference is accumulated in the past-image accumulation part 85.

The position-determining part 88 specifies difference in the images or the position of the last stored or taken-off item on the basis of the result of the determination by the difference-determining part 87. Subsequently, the position-determining part 88 outputs the position information to the rotation control part 82 and the sound-selecting part 91 in the sound-notification device 80C.

Here, the image-notification device 80B will be described. The image-notification device 80B employs an image to notify the user of the result of the detection by the different-detecting device 80A. The image-notification device 80B includes the difference-image generating part 83, an output-image reversing part 84, and a display 32.

The difference-image generating part 83 generates a difference image on the basis of both the result of determining the presence or absence of difference by the difference-determining part 87 in the difference-detecting device 80A and the past image supplied from the past-image accumulation part 85. Then, the generated difference image is output to an output-image reversing part 84.

As described later, the output-image reversing part 84 flips the image obtained by the camera unit horizontally to allow the user to intuitively recognize the item stored on the backside of the panel.

The display 32 displays an image supplied from the output-image reversing part 84. Note that, the aforementioned output-image reversing part 84 is not always required. Thus, the reversing part 84 may be removed or disused depending on the user's demand or the like. Thus, the difference image from the difference-image generating part 83 may be directly displayed on the display 32.

Here, the sound-notification device 80C will be described. The sound-notification device 80C employs a sound to notify the user of the result of the detection by the difference-detecting device 80A. The sound-notification device 80C includes a sound-accumulation part 89, a sound-content selecting part 90, a sound-selecting part 91, and various speakers 92A to 92C.

The sound-accumulation part 89 accumulates two or more kinds of sounds and uses a nonvolatile memory, such as a hard disk drive or a semiconductor memory. The accumulated sounds are used for distinguishing a sound of interest from others when serving a notice in any of various modes as described later.

The sound-content selecting part 90 suitably selects a sound content from different sound contents accumulated in the sound-accumulation part 89 based on the type of a mode and a sound to be required for notice at the time, and then supplies the selected content to the sound-selecting part 91.

The sound-selecting part 91 receives position information supplied from the position-determining part 88 in the difference-detecting device 80A and the sound content supplied from the sound-content selecting part 90, followed by outputting sound signals to the respective speakers 92A, 92B, 92C, and so on.

Hereinafter, the storage functions of the screen speaker 11 with the storage system constructed as described above will be described.

Display

First, the display function of the screen speaker 11 will be described. This function allows a display to display an image of an item stored and allows the user to easily find the position of such an item even it is placed on the backside of the panel (screen speaker).

Figure 8A:
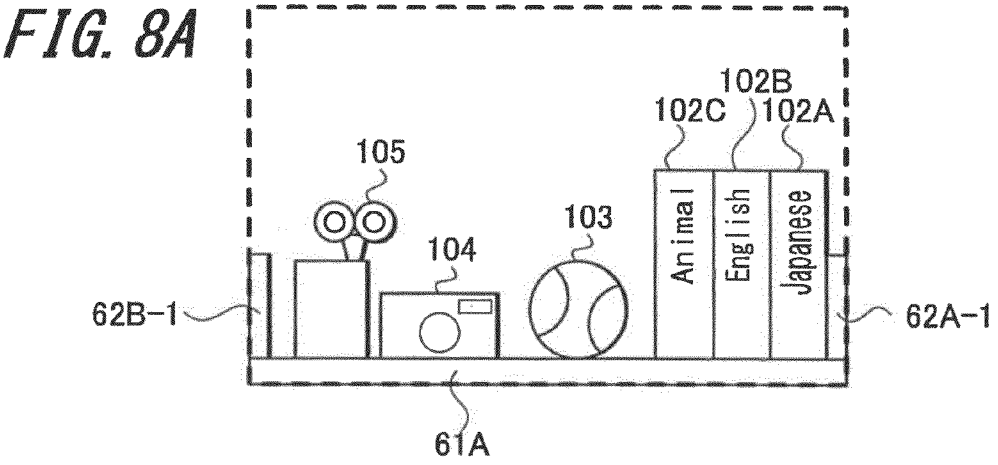
FIGS. 8A and 8B are schematic diagrams illustrating an exemplified image showing stored items, according to an embodiment of the present invention, where
Figure 8B:
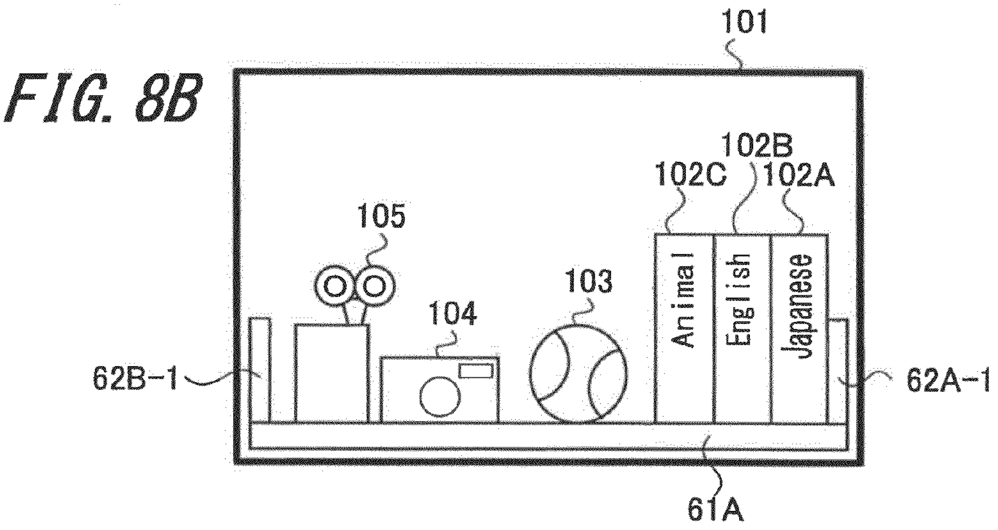

FIGS. 8A and 8B illustrate the states of items stored on the shelf 61A, respectively. In other words, FIG. 8A illustrates an example of the actual state of the items viewing from the backside of the screen speaker 11. FIG. 8B illustrates an example of an image of the actual state of the items on the backside of the screen speaker 11 captured by a camera unit and directly displayed. In this example, from the right side, dictionaries 102A to 102C, a ball 103, a camera 104, and scissors 105 are stored on the shelf 61A. If an image of these stored items is displayed on the display 32 on the front side of the screen speaker 11, as shown in an image 101, the spatial location of the items in the resulting image may be reversed, back and front, relative to the actual location thereof.

Figure 9A:
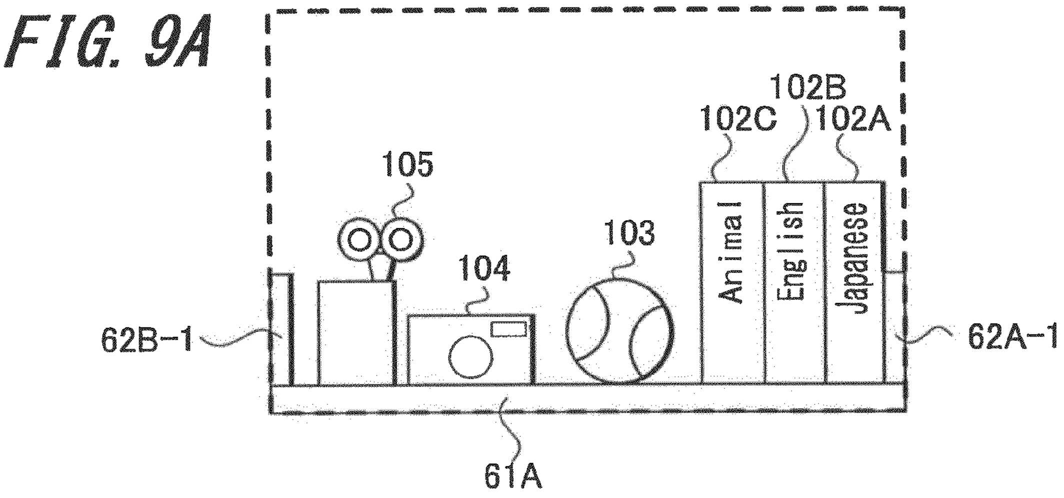
FIGS. 9A and 9B are schematic diagrams illustrating an exemplified image showing stored items, according to an embodiment of the present invention, where
Figure 9B:
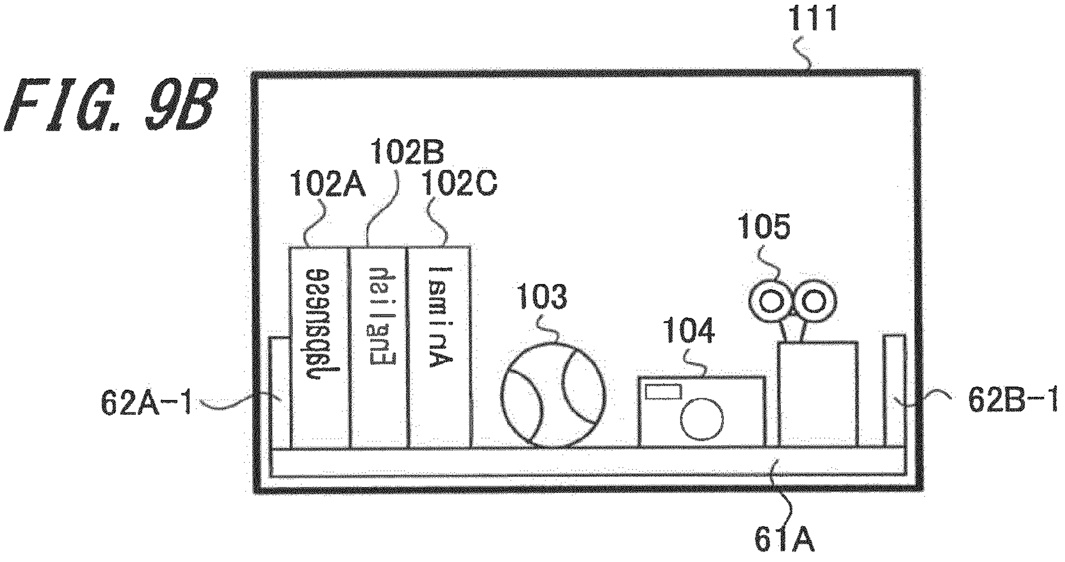

Then, as shown in FIG. 9B, the image 101 is flipped horizontally and displayed as an image 111 to match the spatial location of the items. In this case, from the left side, the image 111 represents dictionaries 102A to 102C, a ball 103, a camera 104, and scissors 105. When displaying such an image, the user can intuitively recognize the positions of the respective items. FIG. 9A represents the actual state viewing from the backside of the screen speaker 11 similarly to the case with FIG. 8A.

Figure 10A:
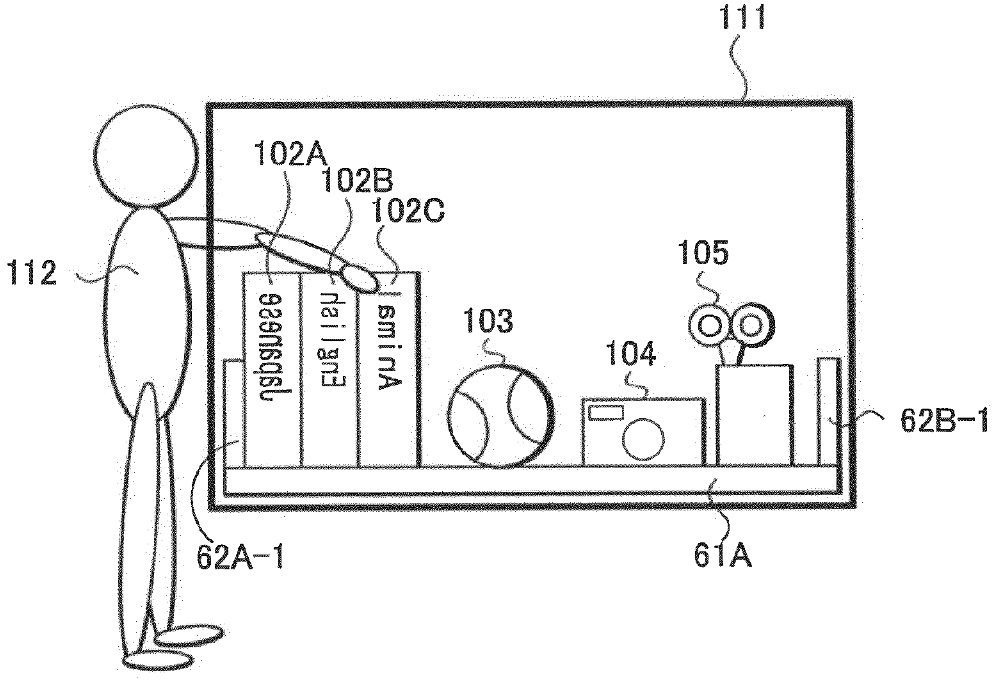
FIGS. 10A and 10B are schematic diagrams illustrating an example of taking out a stored item without viewing the backside of a screen speaker according to an embodiment of the present invention, where
Figure 10B:
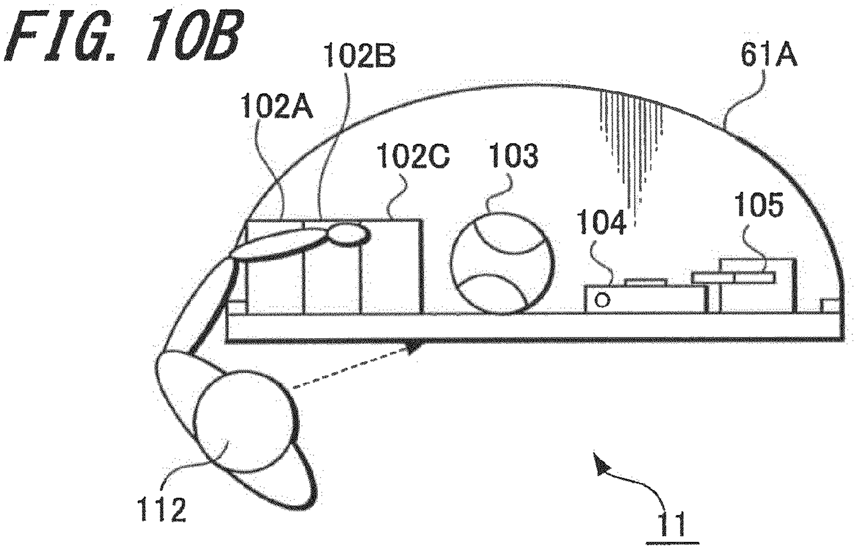

FIGS. 10A and 10B illustrate an example of taking out a stored item without viewing the backside of the screen speaker 11. FIG. 10A is a schematic front view and FIG. 10B is a schematic top view. In this case, the user 112 intuitively touches a stored item of interest by extending his or her hand while standing in front of the panel and looking at the image 111 displayed. In this case, as the stored item can be intuitively touched, so that there is no need of rotating the screen speaker 11 to bring the stored item to the front side.

Figure 11A:
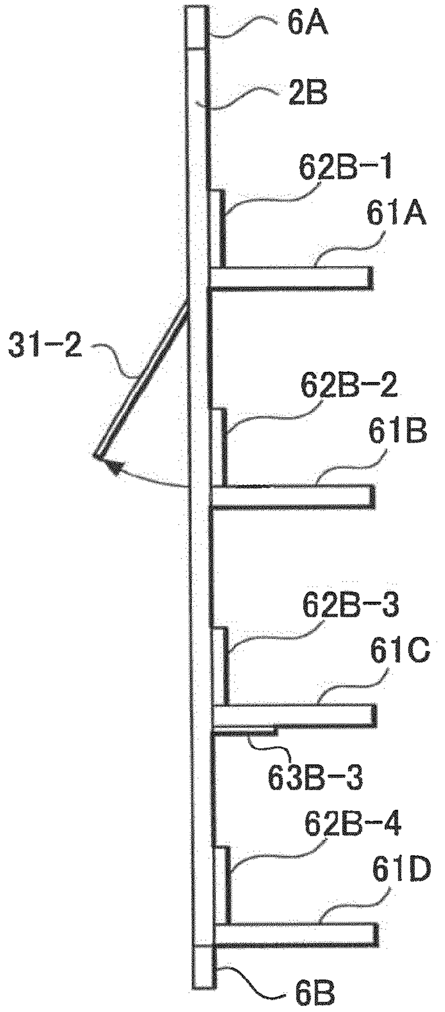
FIGS. 11A and 11B are schematic diagrams illustrating an example in which a flat panel according to an embodiment of the present invention is used as a storage door, where
Figure 11B:
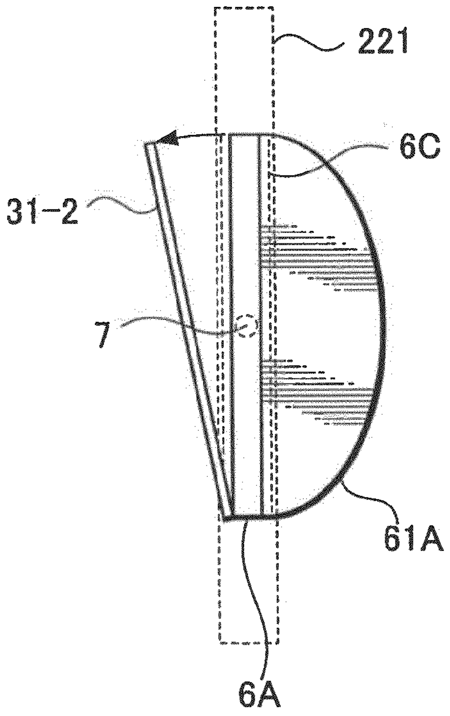

FIGS. 11A and 11B show another example of taking out an item stored on the backside of the screen speaker, where a flat panel is used as a storage door. FIG. 11A is a side view of a single upward-swing panel as an example of the storage door and FIG. 11B is a top view of a single rightward-swing panel as another example of the storage door. The screen speaker 11 includes a rotational shaft 7 and a rotary mechanism 51 so that the whole screen speaker 11 can be rotated.

The single swing panel is a known technology and can be realized by a mechanism using a hinge or a pivoting member as a rotational shaft. Furthermore, the example shown in FIG. 11A provides the upper portion of the panel with a rotational shaft. Alternatively, the rotational shaft may be on the lower portion of the panel to open the panel. In addition, in the case of FIG. 11B, the rotational shaft may be on the left or right side of the panel.

In this way, when a diaphragm 31-2 is designed to a single forward-swing panel, stored items can be visually confirmed from the front of the panel. Thus, the arrangement of the stored items can be recognized as it is seen. The stored item can be taken out without rotating the screen speaker 11. In other words, when each panel, such as a diaphragm, is of a single-swing structure, the rotational shaft 7 and the rotary mechanism 51 shown in FIGS. 2 to 4 are not always required. Stored items can be confirmed and taken out from the front side of the screen speaker by opening the single-swing panel. In the case where the screen speaker 11 is not provided with any rotary mechanism, the shelf may be of a rectangular shape or the like as the shape and dimensions thereof can be designed without depending on the radius of rotation. Furthermore, the panel may be of a single-swing structure while being provided with the rotational shift 7 and the rotary mechanism 51.

Figure 12A:
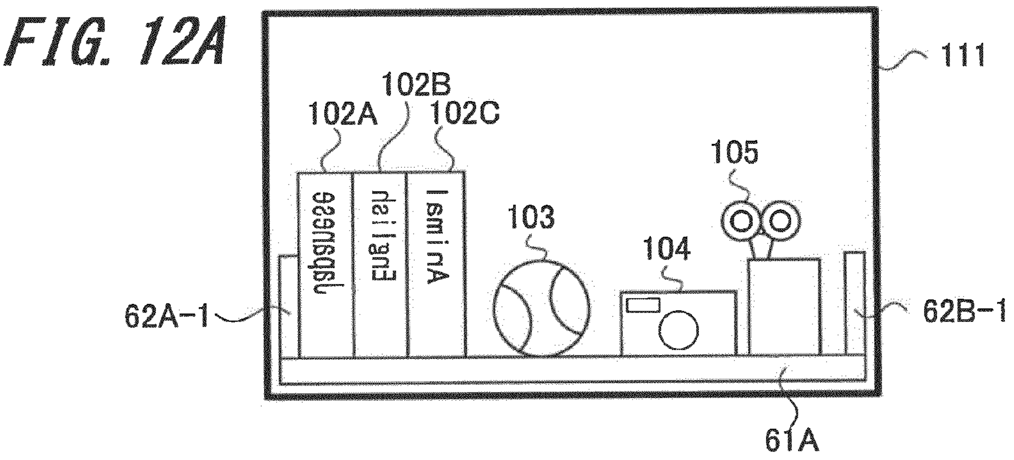
FIGS. 12A and 12B are schematic diagrams illustrating a display example of a taken-out stored item according to an embodiment of the present invention, where
Figure 12B:
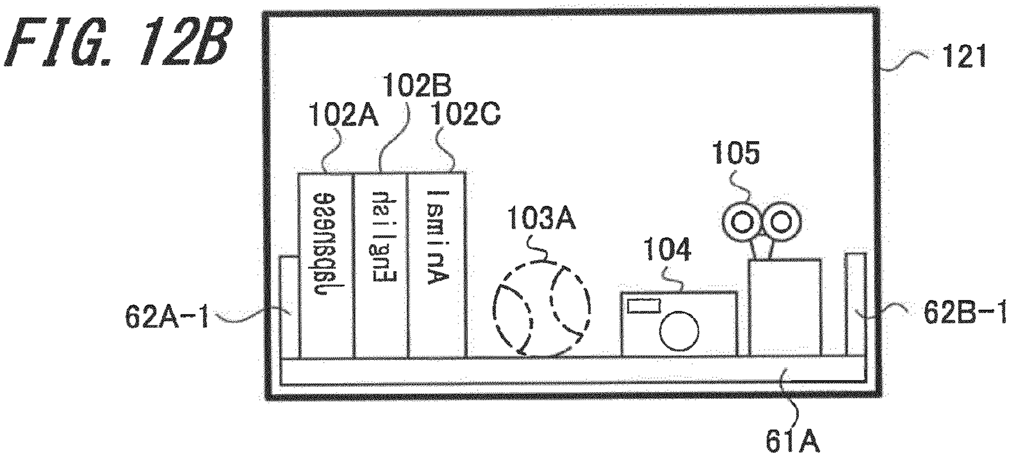

FIGS. 12A to 12C illustrate an example of a display after taking out a stored item. FIG. 12A illustrates an image (reversed image) before taking out the stored item and FIG. 12B illustrates an image in which the place of the stored item having been taken out is highlighted. In this case, the ball 103 is taken out and the place thereof is highlighted by any display method, such as blinking, as shown in FIG. 12B. For example, this display mode may be used for a return mode. The details of the return mode will be described later.

Figure 13:
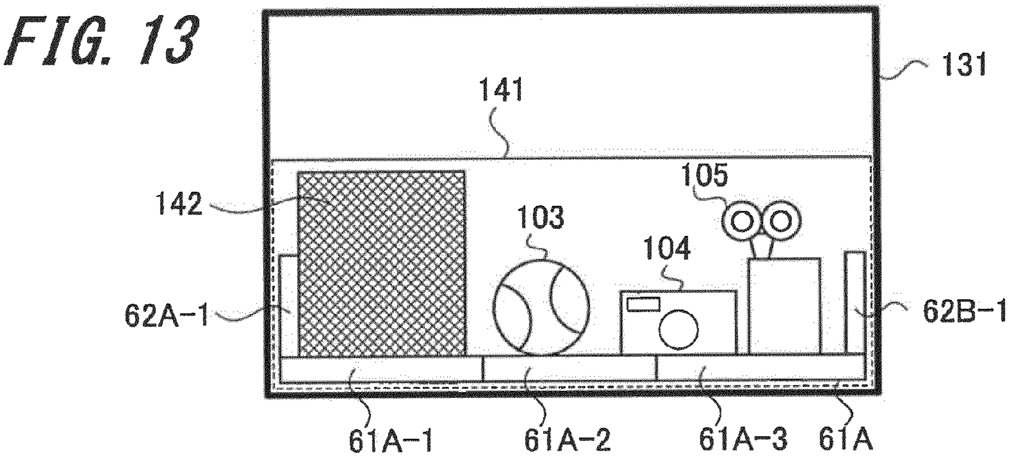
FIG. 13 is a schematic diagram illustrating a display example of an empty space according to an embodiment of the present invention.

FIG. 13 is an example of displaying an empty space. In this display mode, the empty space is represented using a color. An empty space (void, area) 142 of the storage space in an image 131 is shown using a color different from those for other portions. In the present embodiment, the empty space is determined by analyzing an image obtained by the camera unit in the storage system shown in FIG. 7. However, the empty space may be determined using another method.

For example, a meter is mounted on the top surface of the shelf 61A or the shelf 61 itself may be formed of a meter. In the example shown in FIG. 13, the area of the shelf 61 is divided into substantially three areas and meters 61A-1 to 61A-3 are then mounted to three divided areas, respectively. The weights of the shelf are determined by the meters 61A-1 to 61A-3 before and after the storage, respectively. Then, the difference between the weights is used for detecting whether any item is placed on the area (shelf) corresponding to the meters detecting the weight difference or any stored item is taken out.

Next, various modes to be realized with the storage system of the present embodiment will be described. Here, a takeoff mode, a return mode, a return-facilitating mode, and a mode for searching a storage-possible place will be described. In the present embodiment, there is described an example in which the process is carried out in each mode on the basis of an image obtained by the camera unit.

Takeoff mode

This mode makes a comparison between images before and after taking out a stored item to easily confirm the stored item being taken out.

Figure 14:
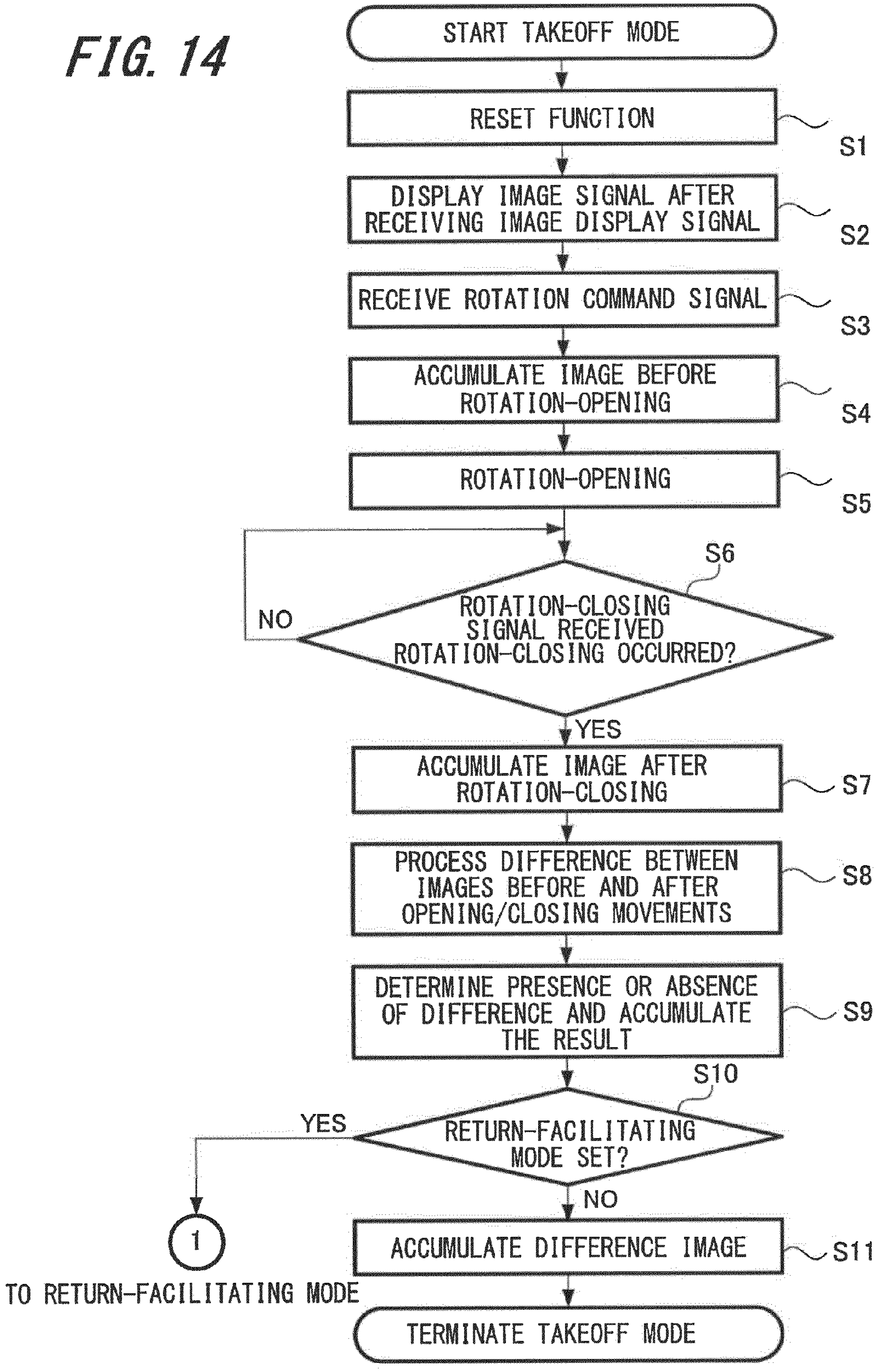
FIG. 14 is a flowchart representing an exemplified process in a takeoff mode according to an embodiment of the present invention.
Figure 15:
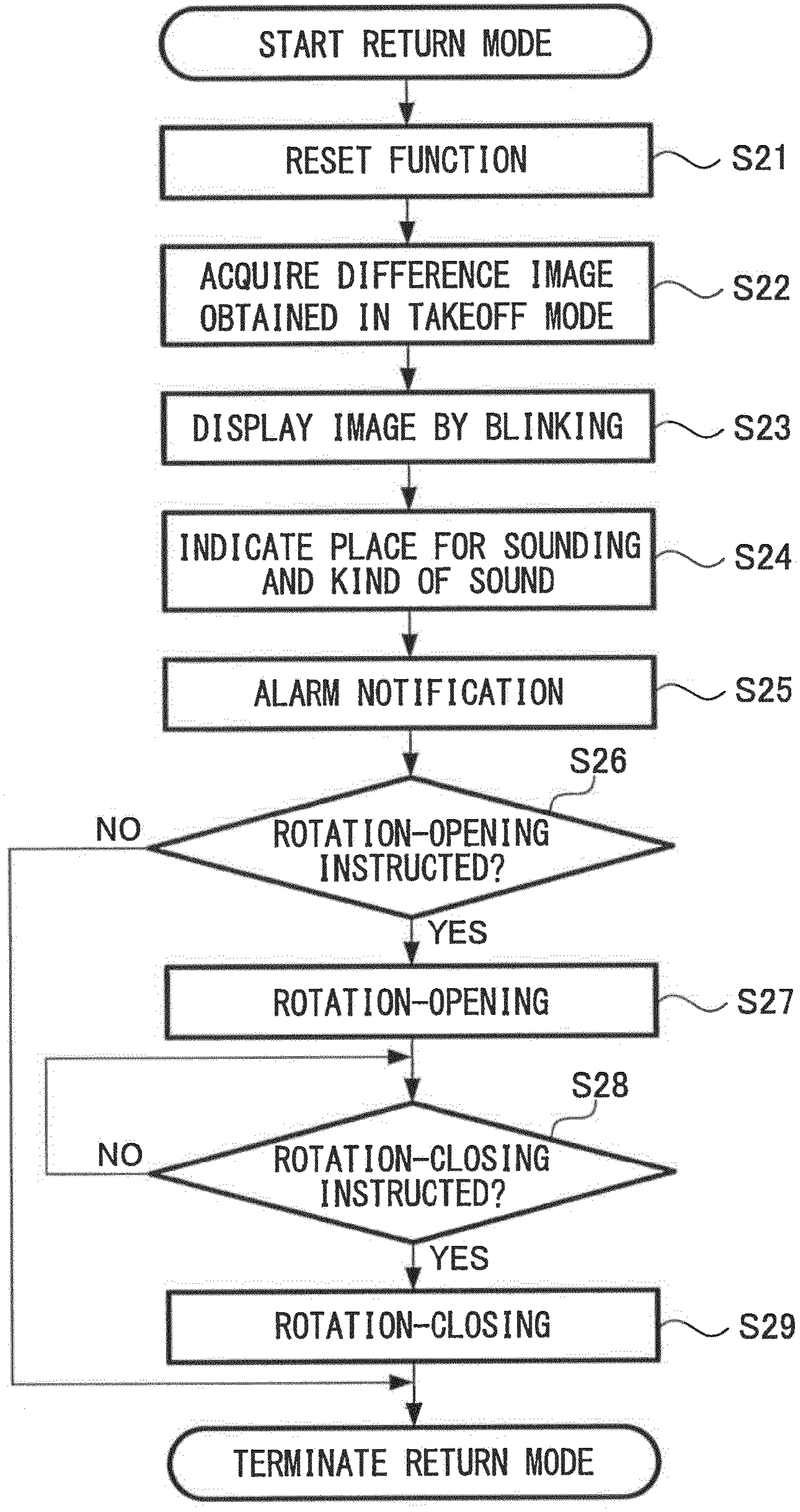
FIG. 15 is a flowchart representing an exemplified process in a return mode according to an embodiment of the present invention.

Referring now to the flowchart of FIG. 14, an exemplified process in the takeoff mode will be described. At first, the user operates a RC device to select a takeoff mode from a menu screen displayed on the display 32. This operation is an example of operation initiating the takeoff mode. As another example of the procedure for initiating the takeoff mode, the user may operate a takeoff key (not shown) on the screen speaker 11 when wishing to take off the item.

When the takeoff mode is initiated, the function is reset (initialized) (Step S1). Subsequently, when the RC-signal receiving/processing part 81 receives the command of an image display signal from the user, the image-notification device 80B allows the display 32 to display an image based on the command (Step S2). When the user determines there may be a need of taking out a stored item and then indicates the rotation of the screen speaker 11, the RC device generates a rotation-instructing command and the RC-signal receiving/processing part 81 then receives the command (Step S3). When receiving the rotation-instructing command, the past-image accumulation part 85 also accumulates an image of the storage part before opening by the rotation (rotation-opening), which has been obtained by the camera unit (Step S4). Subsequently, the RC-signal receiving/processing part 81 sends the rotation-instructing command to the rotation control part 82, initiating the rotation of the screen speaker 11 (Step S5).

After taking off the stored item, the user operates the RC device to supply a rotation-closing signal (Step S6). Then, the RC-signal receiving/processing part 81 receives the rotation-closing signal. Subsequently, after terminating the rotation of the screen speaker 11, the past-image accumulation part 85 accumulates the image of the storage part obtained by the camera unit (Step S7). Subsequently, a difference-image processing is carried out at the image-difference processing part 86 using images before and after the opening and closing of the screen speaker 11 (Step S8). The contents of the processing are sent to the difference-determining part 87. Subsequently, this part 87 determines the presence or absence of the difference. The result of the determination is accumulated at the past-image accumulation part 85 (Step S9).

Here, the process for allowing the user to use a display, sounds, or the like to confirm whether a return-facilitating mode described later should be set (Step S10). If the user sets the return-facilitating mode, then the mode shifts to the return-facilitating mode as described later. If the return-facilitating mode is not set, then its difference image is accumulated at the past-image accumulation part 85 (Step S11). Consequently, the takeoff mode is completed.

In the present example, the user is allowed to confirm whether the return-facilitating mode should be set. Alternatively, the return-facilitating mode may be automatically set at the time of detecting the operation of taking out the stored item. When an automatic mode is set in any service, such as one in a library where lending of items such as books is carried out, the number of return misses can be reduced as the return-facilitating mode is automatically set after the takeoff.

There may be a case that the user may accidentally shift items stored on the shelf at the time of taking off a stored item of interest. In this case, the position of the stored item is shifted on the image obtained by the camera unit and thus there is a possibility of misjudging that the stored item has been taken out. For taking measures against such a misjudgment, for example, there is a process of canceling the takeoff by the reset operation when the user has noticed that the position of the stored item has been shifted. As one of other methods, the storage and takeoff of the respective stored items can be managed using RFID (radio frequency identification) tags or the like attached thereon. As an alternative method, a movement error of an object (stored item) on the image is defined and the movement of the stored item is then determined by the difference-determining part 87. When the result of the determination is within the error range, a process for determining that the stored item has not been taken out may be carried out.

Return Mode

This mode is responsible for the function of allowing the storage system to search a return place.

Referring now to the flowchart of FIG. 14, an exemplified process in the return mode will be described. First, the user operates a RC device to select a return mode from a menu screen displayed on the display 32. This operation is an example of operation initiating the return mode. As another example of the procedure for initiating the return mode, the user may operate a return key (not shown) arranged on the screen speaker when wishing to return the item.

When the return mode is initiated, the function is reset (initialized) (Step S21). The difference-image generating part 83 acquires the difference image which has been obtained at the time of the takeoff mode (Step S22). Subsequently, the difference-image generating part 83 superimposes the difference image on the image accumulated before the takeoff, followed by carrying out the blinking (highlighted) representation of the portion having the difference (Step S23).

As shown in FIG. 12B, the image 103 before the takeoff and the difference image 103A after the takeoff are overlapped and blinked. The highlight representation is not limited to the blinking representation. In this case, when storage shelves are arranged on "N" different positions on the screen speaker 11, the number of the displays 32 may be smaller than that of the shelves. In such a case, for the display-free position, a vibrator (speaker) corresponding to such a position plays a sound corresponding to the position. In addition, the sound-selecting part 91 selects the kind of a sound source with respect to the position of the shelf (Step S24), generating an alarm notification (Step S25).

Subsequently, processing is carried out in response to the instruction of rotation-opening or terminating the rotation based on the user's operation. For example, it is determined whether the RC-signal receiving/processing part 81 receives an instruction command for rotation-opening (Step S26). If it has been received, then the rotation-instruction signal is supplied to the rotation control part 82, allowing the screen speaker 11 to rotate (Step S27). If it has not been received, then the return mode is terminated.

Furthermore, it is determined whether the RC-signal receiving/processing part 81 receives a rotation-closing command (Step S28). If it is received, then the rotation-closing command is sent to the rotation control part 82 to terminate the rotation of the screen speaker 11 (Step S29), thereby completing the return mode. Furthermore, if the rotation-closing command has not been received, then the rotation control part 82 waits for the instruction of terminating the rotation.

Figure 19:
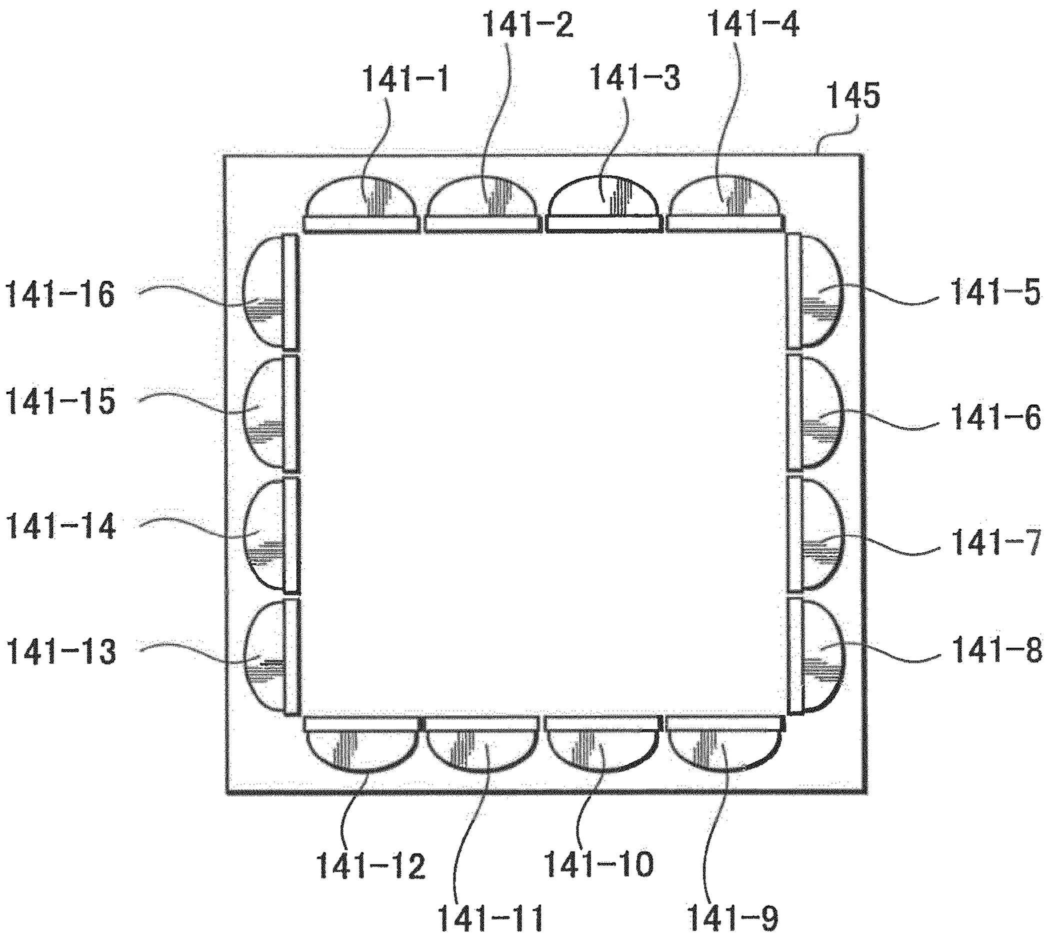
FIG. 19 is a schematic diagram illustrating an example in which screen speakers according to an embodiment of the present invention are applied to a whole room.

As described above, even if the user is doing another task, the user can determine instantly where the takeoff item to be returned, by changing the position of making a sound and the kind of the sound source. It is more easily recognizable and more user-friendly if such sound use is applied to the whole room formed with the screen speakers 11 as illustrated in FIG. 19.

Return-facilitating Mode

This mode is responsible for the function of allowing the storage system to facilitate the return of stored items being taken off, when the return thereof is delayed.

Figure 16:
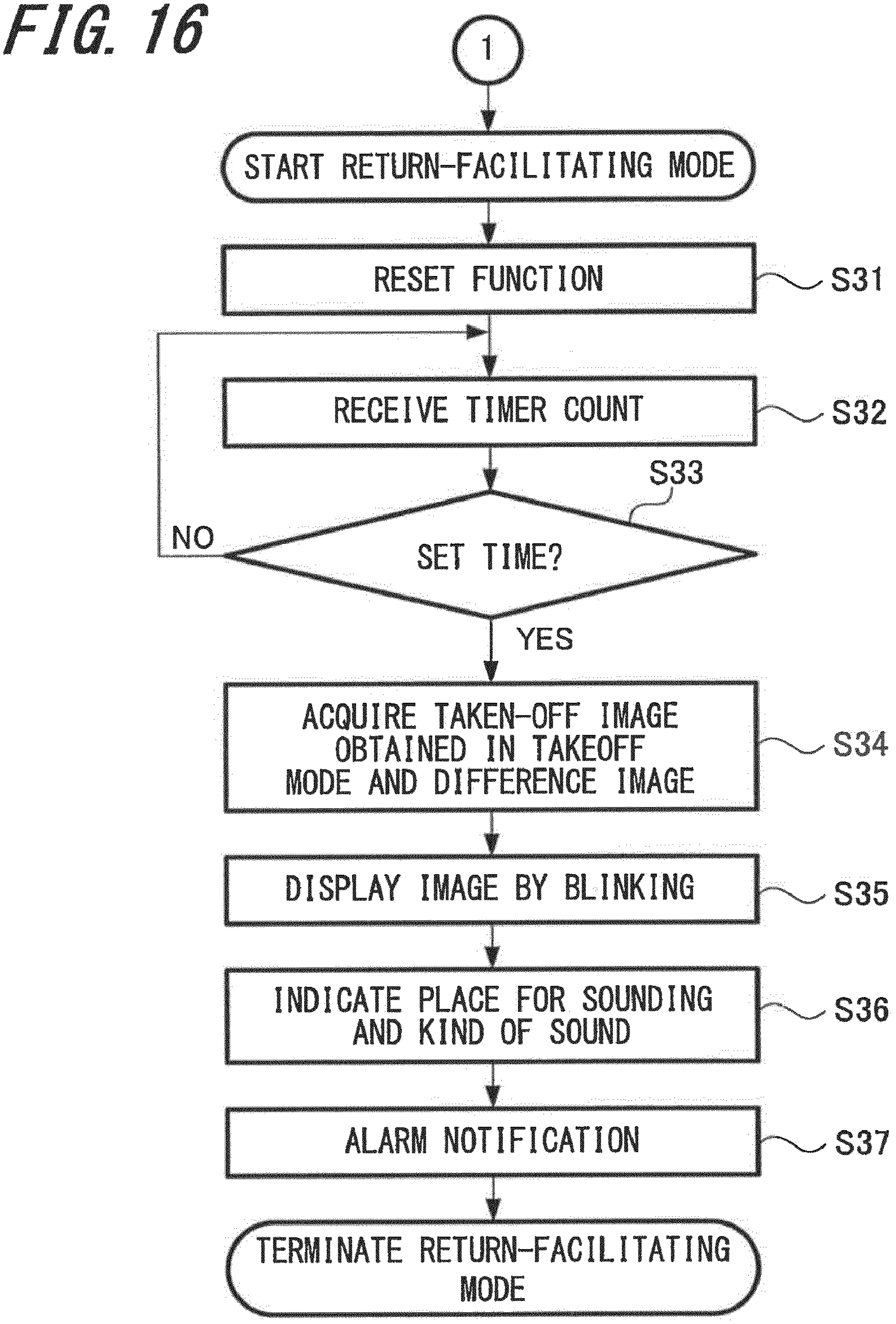
FIG. 16 is a flowchart representing an exemplified process in a return-facilitating mode according to an embodiment of the present invention.

Referring now to the flowchart of FIG. 16, an exemplified process in the return-facilitating mode will be described. First, when the return-facilitating mode is initiated, for example, by selecting the return-facilitating mode in the flowchart of FIG. 14, the function is reset (initialized) (Step S31). Then, a timer (not shown) is set for a predetermined time and then the timer starts to count the time (Step S32). The count of the timer (time period) starts upon determining a fact that the stored item of interest is taken off by analyzing an image obtained by the camera.

Subsequently, the count of the timer is checked (Step S33). At the timer set time before the predetermined due date for return, the images before and after the takeoff are used in the difference-image generating part 83 (Step S34) and an image of the place from which the stored item has been taken off is then blinked (Step S35). Furthermore, a vibrator to be sounded is correlated with the position of the shelf to which the item is returned, while the kind of a sound source is selected depending on the position of the shelf (Step S36), generating an alarm notification (Step S37). After the alarm notification, the return-facilitating mode is terminated.

The user may set the due date for return in advance and may store it in a nonvolatile memory (not shown). At this time, the same due date may be set for all items or different due dates may be set for different items using the weights thereof or RFID tags.

Figure 17:
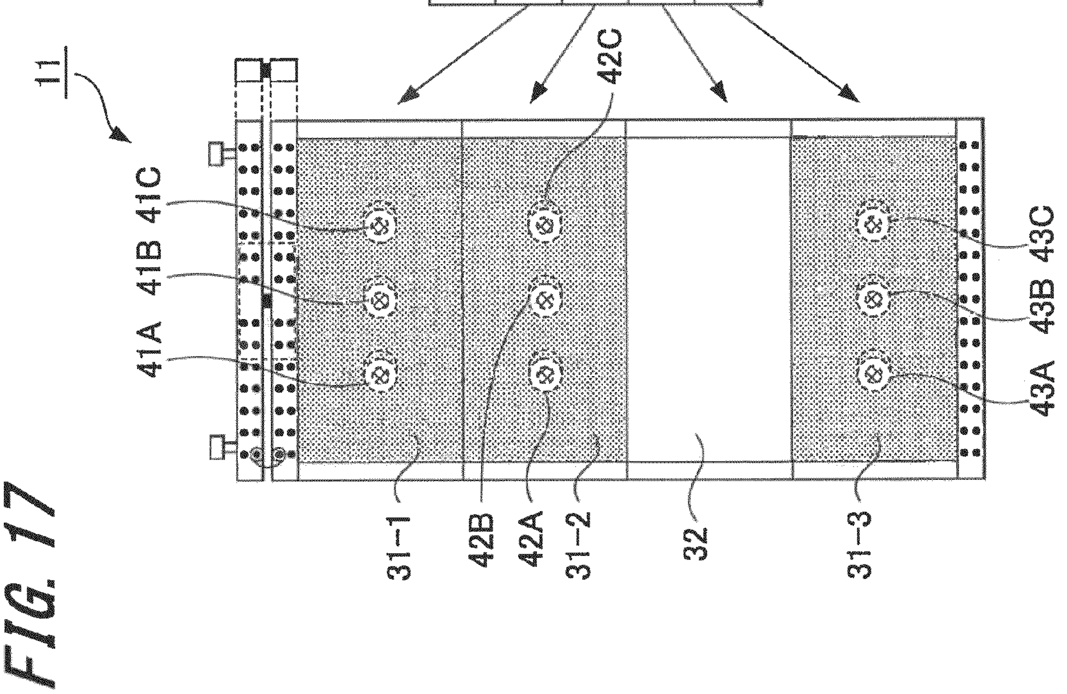
FIG. 17 is a schematic diagram illustrating an example of correlation of shelves with vibrators and musical sounds according to an embodiment of the present invention.

FIG. 17 illustrates an exemplified table representing the list of shelves and vibrators with corresponded musical sounds. In this example, the positions of the shelves 1 to 4 (corresponding to the shelves 61A to 61D in FIG. 4) and the 1st to 4th vibrators (41A to 41C, 42A to 42C, and 43A to 43C) are allocated from the top to the bottom of the screen speaker 11 and the sound sources are then allocated in the order of four pieces of music 1 to 4. Furthermore, the display 32 is placed on the 3rd position and any flat panel speaker (i.e., a vibrator) is not arranged on that position. Thus, no sound is output from the 3rd position.

Storage-Possible Place Searching Mode

This mode is responsible for the function for storing an item if desired. As shown in FIG. 13, it is the function of representing an empty space using a color. A search-area upper limit line 141 is suitably changed in response to an item to be housed. In other words, it is indicated that the search area can be extended in the height direction when the item is tall.

Figure 18:
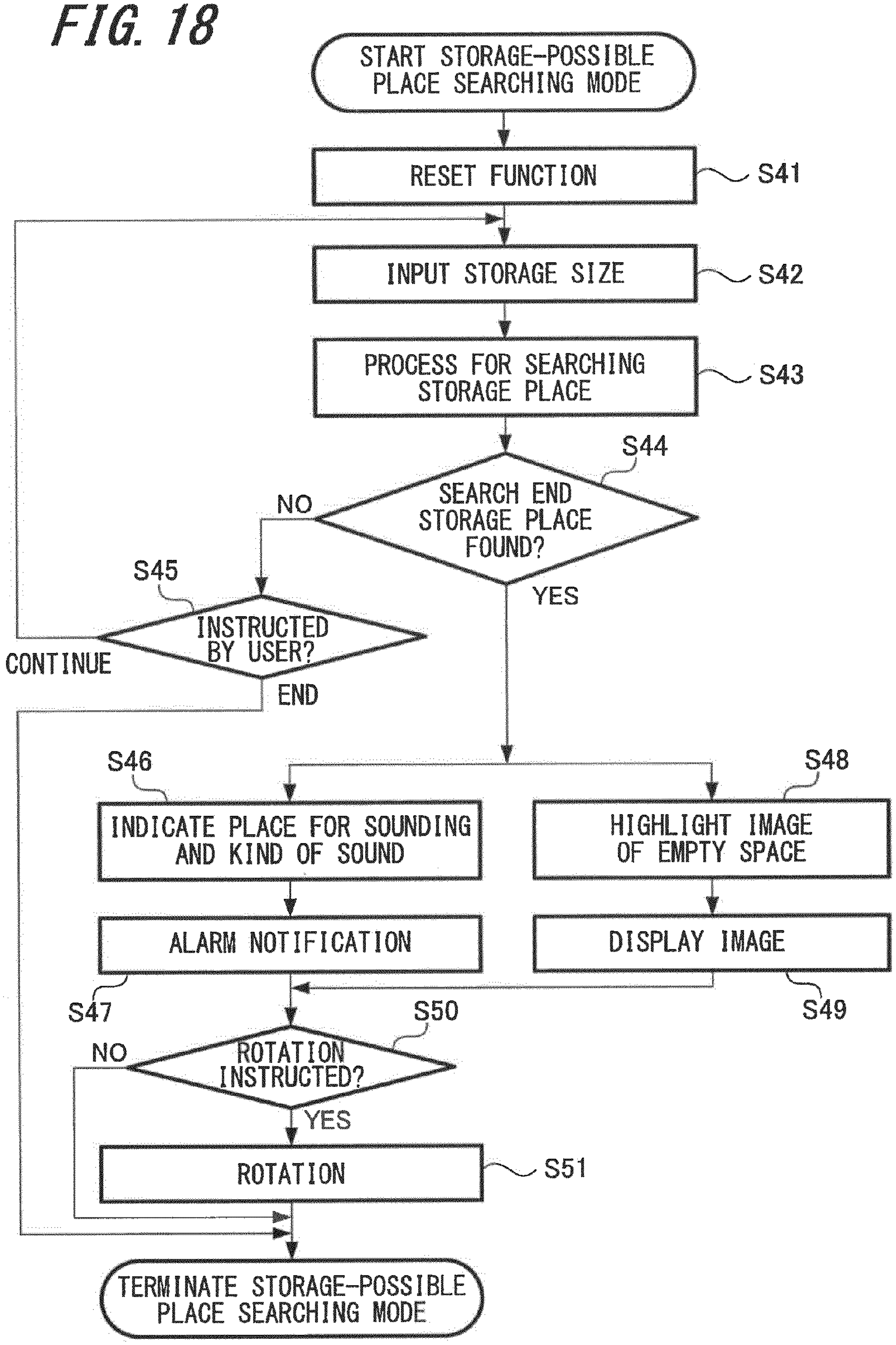
FIG. 18 is a flowchart representing an exemplified process in a mode for searching a storage-possible place according to an embodiment of the present invention.

Referring now to the flowchart of FIG. 18, an exemplified process in the storage-possible place searching mode will be described. First, the user selects the storage-possible place searching mode from a menu screen displayed on the display 32 by operating a RC device. This operation is an example of operation for initiating the storage-possible place searching mode. As another example of the procedure for initiating the storage-possible place searching mode, the user may operate a storage-possible place searching key (not shown) arranged on the screen speaker 11, when wishing to take out the item.

When the storage-possible place searching mode is initiated, the function is reset (initialized) (Step S41). Here, a menu screen (not shown) is displayed for the user to input the size of storage space (Step S42). In this case, methods for inputting the size of storage space include, for example, a direct input method, a method of specifying attributes in numeric terms or the like, for example specifying as "A4 size, red", and a method of specifying the frame size of an input size using a pointing device, such as a touch panel. Furthermore, there is a method of searching an empty space without specifying the size of storage space by the user.

Furthermore, after specifying the size of storage space, in the difference-detecting device 80A, the image-difference processing part 86 and the difference-determining part 87 carry out a process for searching a storage-possible place, an empty space that satisfies the specified requirements about the size of storage space (Step S43). After completing the search, it is determined whether the storage-possible place is present or not (Step S44).

Here, if there is no storage-possible place, then the display 32 displays a selection screen that indicates the user to determine whether the process of searching a storage-possible place should be continued (Step S45). If the user determines to end the search for the storage-possible place, then the storage-possible place searching mode is terminated. If the user determines to continue the search for a storage-possible place, then the process returns to the step S42 for inputting the size of storage space.

If any empty space (storage-possible place) is found as a result of the process of searching a storage-possible place, then the position-determining part 88 in the difference-detecting device 80A supplies the information about the storage-possible place to the sound-selecting part 91 in the sound-notification device 80C. The sound-selecting part 91 designates a place to be sounded and the kind of a sound (Step S46), generating an alarm notification (Step S47).

Furthermore, a difference image, the information about the storage-possible place, is supplied from the difference-determining part 87 in the difference-detecting device 80A to the difference-image generating part 83 in the image-notification device 80B. The difference-image generating part 83 highlights an image of the empty space (Step S48) and then supplies the image to the display 32 to be displayed (Step S49).

Subsequently, the RC-signal receiving/processing part 81 determines the presence or absence of a rotation-instruction command from the user (Step S50). If the RC-signal receiving/processing part 81 receives a rotation-instruction command, then the RC-signal receiving/processing part 81 instructs the rotation control part 82 to rotate the screen speaker 11 (step S51), terminating the storage-possible place searching mode. If the rotation-instruction command is not received, then the storage-possible place searching mode is terminated.

Furthermore, in the case of the storage-possible place searching mode, as shown in FIG. 13, the wall of the storage part above the shelf 61A may preferably be colored with a single color. Accordingly, as the background is colored with a predetermined single color in the process of searching a storage-possible place, any portion with color other than the predetermined single color can be recognized as an object (stored item) Thus, an area 142 without any object can be determined as a large block of an empty space.

FIG. 19 is a diagram viewing a room 145 from above, where the room 145 has a plurality of screen speakers 11 constituting walls.

The walls 141-1 to 141-16 surrounding the four sides of the room 145 are, for example, those having the same functions as those of the screen speaker 11 (see FIGS. 3 to 7). In other words, as FIG. 19 is of viewing from above, the walls 141-1 to 141-16 are represented so that they are connected to one another in the horizontal direction. In actual, however, the panels of diaphragms, displays, and so on are also connected in the vertical direction. Here, the number of the panels is selected optionally.

In an example shown in FIG. 19, the room 145 is constructed of four sides made of walls 141-1 to 141-4, walls 141-5 to 141-8, walls 141-9 to 141-12, and walls 141-13 to 141-16, respectively. In other words, each of the four sides surrounding the room 145 includes four walls. The room 145 is an example of the room constructed of walls of an embodiment of the present invention.

Each of the walls 141-1 to 141-16 acts as a screen (wall) and also serves as a speaker, a display, or the like in a manner similar to the screen speaker 11. In other words, similar to the screen speaker 11, each of the walls 141-1 to 141-16 is able to output various sounds and images by increasing the number of vibration members and displays in the vertical direction, adjusting the thickness of the vibration member, and so on.

In this way, the room 145 can be constructed with a higher flexibility to output sounds with a broad frequency band ranging from low frequency to high frequency by placing walls 141-1 to 141-16 having the same function and configuration as those of the screen speaker 11 and arranging panels of vibration members and so on. Alternatively, the walls 141-1 to 141-16 can also be used for displays, mirrors, and so on.

In the example of FIG. 19, the room 145 has been described as one surrounded with four sides. According to an embodiment of the present invention, however, the number of the sides of the room is not limited to four. The room may have at least one side. In addition, in the above example, four walls (for example, walls 141-1 to 141-4) constitute one side. According to an embodiment of the present invention, however, the number of walls is not limited to four. At least one wall may be provided for one side.

Furthermore, for example, the vibration member 31 alone may be fixed to the screen speaker 11. Alternatively, one of the display 32, a mirror, a panel made of a wall member with a predetermined shape, and so on alone may be fixed on the screen speaker 11. In other words, the user can use the screen speaker 11 with any of various panel forms (for example, using the same kind of panels or different kinds of panels in combination) depending on estimated costs and uses. For example, the screen speaker 11 can be applied to a double wall in a high-class apartment (collective housing) or the like.

As described above, the storage space can be out of the user's sight in the room, when using the screen speaker 11 having storage parts on the backside thereof. As a result, the room can be simplified, leading to an improvement in interior decoration.

Furthermore, a space may be given between the backsides (storage parts) of the respective walls 141-1 to 141-16 and the wall member of the room 145. In this case, a passage can be formed between them and can be utilized as a walk-in closet or the like.

Furthermore, in the example shown in FIG. 19, the screen speaker 11 is vertically arranged and used for the wall. Alternatively, the screen speaker 11 may be used for the ceiling. In this case, the storage part may be formed on the backside of the whole ceiling or any of panels constituting the ceiling. Thus, an attic storage space can be formed in a residence (building).

As described above, according to the present embodiment, the backside of the screen speaker can be efficiently used as one having a storage function by making use of a speaker, a display, a sensor (camera unit), or the like originally installed in the screen speaker. Specifically, according to the embodiment, for example, the user may readily return a taken-out item to the original position and may be prompted to return the taken-out item. In addition, the user can intuitively find a position where an item to be taken is located. Furthermore, the user can intuitively take out the item even if it is located on the backside of the screen speaker and can be informed about a place on which the user desires to store the item, leading to an improvement in usability of the screen speaker in terms of storage function.

In the above embodiment, the shelf has a semi-circular shape. Alternatively, the shelf may have any of various shapes. In addition, the shelf may be designed to have a strength or the like. Furthermore, the display is not limited to a flat-screen display. Alternatively, the display may be a projection screen for a projector as proposed in Japanese Unexamined Patent Application Publication No. 2007-67538. The vibrator mounted on the panel may be one using coils and magnets, one using a super magnetostrictor, or the like.

Furthermore, the storage system as described while taking the screen speaker 11 as an example can be applied to a refrigerator, a coin locker, or the like. In other words, a display may be mounted on the front side of the door of the refrigerator, coin locker, or the like, and the backside of the display is used as a storage part. In this case, the user is allowed to confirm items stored in the inside thereof by looking at a screen displayed on the door (display) of the refrigerator, coin locker, or the like without opening the door.

It should be understood by those skilled in the art that various modifications, combinations, sub-combinations and alterations may occur depending on design requirements and other factors insofar as they are within the scope of the appended claims or the equivalents thereof.

What is claimed is:

1. A storage system, comprising:
a storage unit that stores items;
an imaging device that captures an image of the items stored in the storage unit;
a panel-shaped display that displays the image of the items stored in the storage unit, wherein the storage unit is provided on the backside of the display;
a difference-detecting unit that detects a difference between images of an item before and after being stored in the storage unit; and
a notification unit that notifies an external area of the storage unit of a detection result from the difference-detecting unit,
wherein when a takeoff mode is designated at the storage system, the notification unit determines a position of a taken-off stored item on the basis of the presence or absence of the difference between the images of the item before and after being stored in the storage unit and notifies the display of the position of the taken-off stored item, and the display highlights the position of the taken-off stored item.

2. The storage system according to claim 1, wherein
the storage unit is a shelf formed on the backside of the display.

3. The storage system according to claim 2, further comprising a frame having one or more rectangular-shaped openings for allowing the display to be removably fixed therein.

4. The storage system according to claim 3, wherein
the shelf is fixed using the frame.

5. The storage system according to claim 3, wherein
a panel-shaped speaker is fixed in part of the frame.

6. The storage system according to claim 5, wherein
one of the display and the speaker is formed to serve as a door.

7. The storage system according to claim 1, wherein
the display displays the image as a mirror-reversed image such that a location of a display of a respective one of the items in the mirror-reversed image corresponds to a physical location of the respective one of the items behind the display.

8. The storage system according to claim 1, wherein
when a return mode is designated at the storage system, the notification unit determines a position of a previously taken-off stored item on the basis of the presence or absence of the difference between the images of the item before and after being stored in the storage unit and notifies a user of a candidate return place.

9. The storage system according to claim 1, wherein
when a return-facilitating mode is designated at the storage system, the notification unit determines a position of a previously taken-off stored item on the basis of the presence or absence of the difference between the images of the item before and after being stored in the storage unit and notifies a user of the position of the taken-off stored item when the stored item is not returned after a predetermined period from the start of the return-facilitating mode.

10. The storage system according to claim 1, wherein
when a storage-possible place searching mode is designated at the storage system, the difference-detecting unit determines the presence or absence of a storage-possible place by making a comparison between a state without stored items in the storage unit and a present state thereof and notifies a user of the storage-possible place on the basis of a result of the determination by the difference-detecting unit.

11. A storage panel including a storage system, comprising:
a storage unit that stores items;
an imaging device that captures an image of the items stored in the storage unit;
a panel-shaped display that displays the image the items stored in the storage unit, in which the storage unit is provided on the backside of the display;
a frame that includes one or more rectangular openings and that removably fixes the display in the opening;
a difference-detecting unit that detects a difference between images of an item before and after being stored in the storage unit; and
a notification unit that notifies an external area of the storage unit of a detection result from the difference-detecting unit,
wherein when a takeoff mode is designated at the storage panel, the notification unit determines a position of a taken-off stored item on the basis of the presence or absence of the difference between the images of the item before and after being stored in the storage unit and notifies the display of the position of the taken-off stored item, and the display highlights the position of the taken-off stored item.

12. A storage wall including a storage panel having a storage system, comprising:

a storage unit that stores items;

an imaging device that captures an image of the items stored in the storage unit; and a panel-shaped display that displays the image of the items stored in the storage unit, in which the storage unit is provided on the backside of the display; and a frame that includes one or more rectangular openings and that removably fixes the display in the opening;

a difference-detecting unit that detects a difference between images of an item before and after being stored in the storage unit; and a notification unit that notifies an external area of the storage unit of a detection result from the difference-detecting unit, wherein when a takeoff mode is designated at the storage wall, the notification unit determines a position of a taken-off stored item on the basis of the presence or absence of the difference between the images of the item before and after being stored in the storage unit and notifies the display of the position of the taken-off stored item, and the display highlights the position of the taken-off stored item.

13. The storage wall according to claim 12, further comprising a rotary unit that rotatably connects the storage wall to a fixed wall for which the storage wall is provided.

14. A storage system, comprising:

storage means for storing items;

an imaging device that captures an image of the items stored in the storage means; and panel-shaped display means for displaying the image of the items stored in the storage means, wherein the storage means is provided on the backside of the display means;

a difference-detecting unit that detects a difference between images of an item before and after being stored in the storage means; and a notification unit that notifies an external area of the storage means of a detection result from the difference-detecting unit, wherein when a takeoff mode is designated at the storage system, the notification unit determines a position of a taken-off stored item on the basis of the presence or absence of the difference between the images of the item before and after being stored in the storage means and notifies the display of the position of the taken-off stored item, and the display means highlights the position of the taken-off stored item.

15. A storage panel including a storage system, comprising:

storage means for storing items;

an imaging device that captures an image of the items stored in the storage means;

panel-shaped display means for displaying the image of the items stored in the storage means, in which the storage means is provided on the backside of the display means; and a frame that includes one or more rectangular openings and that removably fixes the display means in the opening;

a difference-detecting unit that detects a difference between images of an item before and after being stored in the storage means; and a notification unit that notifies an external area of the storage means of a detection result from the difference-detecting unit, wherein when a takeoff mode is designated at the storage panel, the notification unit determines a position of a taken-off stored item on the basis of the presence or absence of the difference between the images of the item before and after being stored in the storage means and notifies the display of the position of the taken-off stored item, and the display means highlights the position of the taken-off stored item.

16. A storage wall including a storage panel having a storage system, comprising:

storage means for storing items;

an imaging device that captures an image of the items stored in the storage means; and panel-shaped display means for displaying the image of the items stored in the storage means, in which the storage means is provided on the backside of the display means; and a frame that includes one or more rectangular openings and that removably fixes the display means in the opening;

a difference-detecting unit that detects a difference between images of an item before and after being stored in the storage means; and a notification unit that notifies an external area of the storage means of a detection result from the difference-detecting unit, wherein when a takeoff mode is designated at the storage wall, the notification unit determines a position of a taken-off stored item on the basis of the presence or absence of the difference between the images of the item before and after being stored in the storage means and notifies the display of the position of the taken-off stored item, and the display means highlights the position of the taken-off stored item.

* * * * *